BINARY DATA WORD

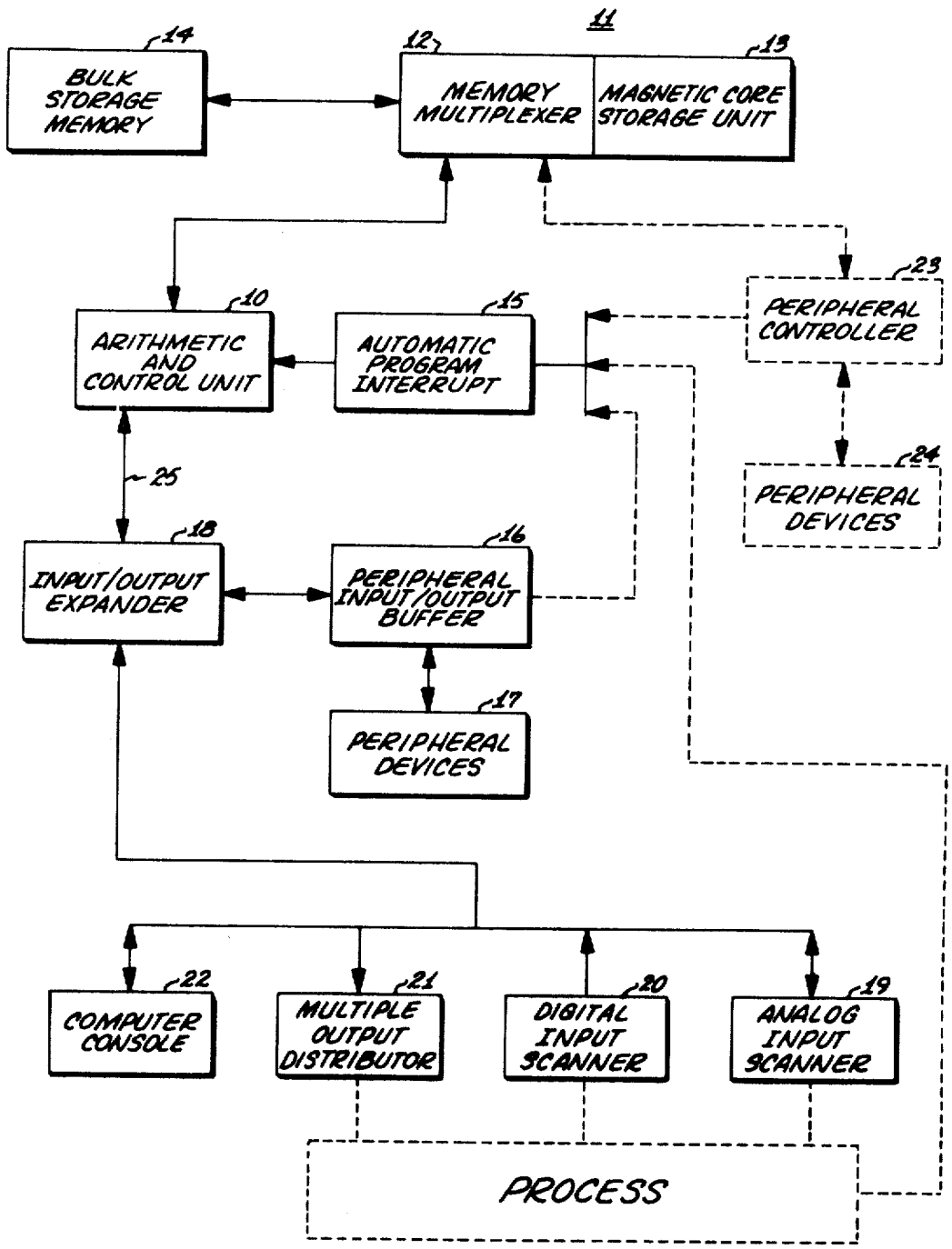

INSTRUCTION WORD-FULL OPERAND AND QUASI INSTRUCTIONS

INSTRUCTION WORD-GEN 1, GEN 2, AND GEN 3 INSTRUCTIONS

INDEX WORD

TIM/TOM CONTROL WORD

AND-GATE

OR-GATE

INVERTER

NAND-GATE

NOR-GATE

FLIP-FLOP

FULL ADDER

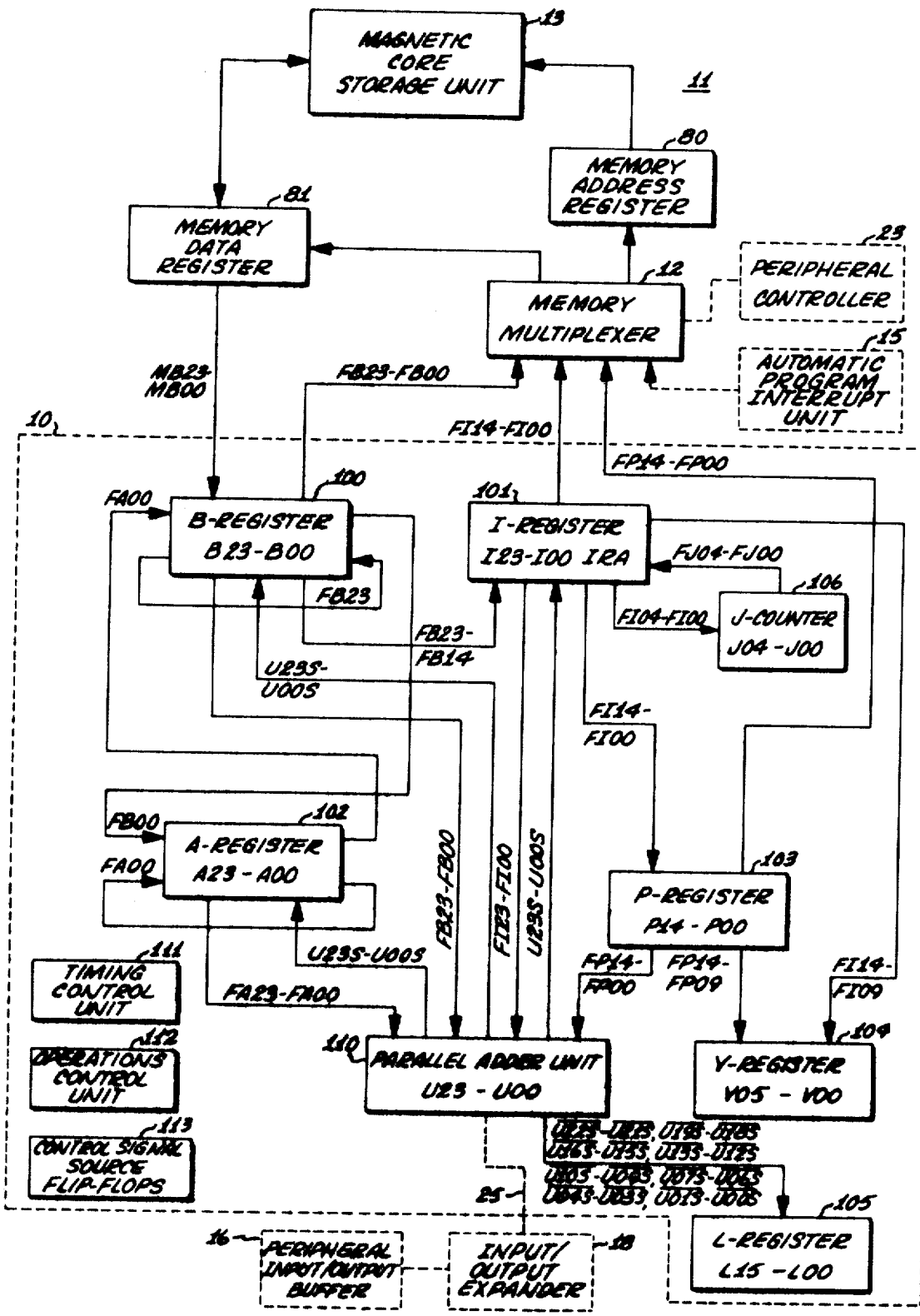

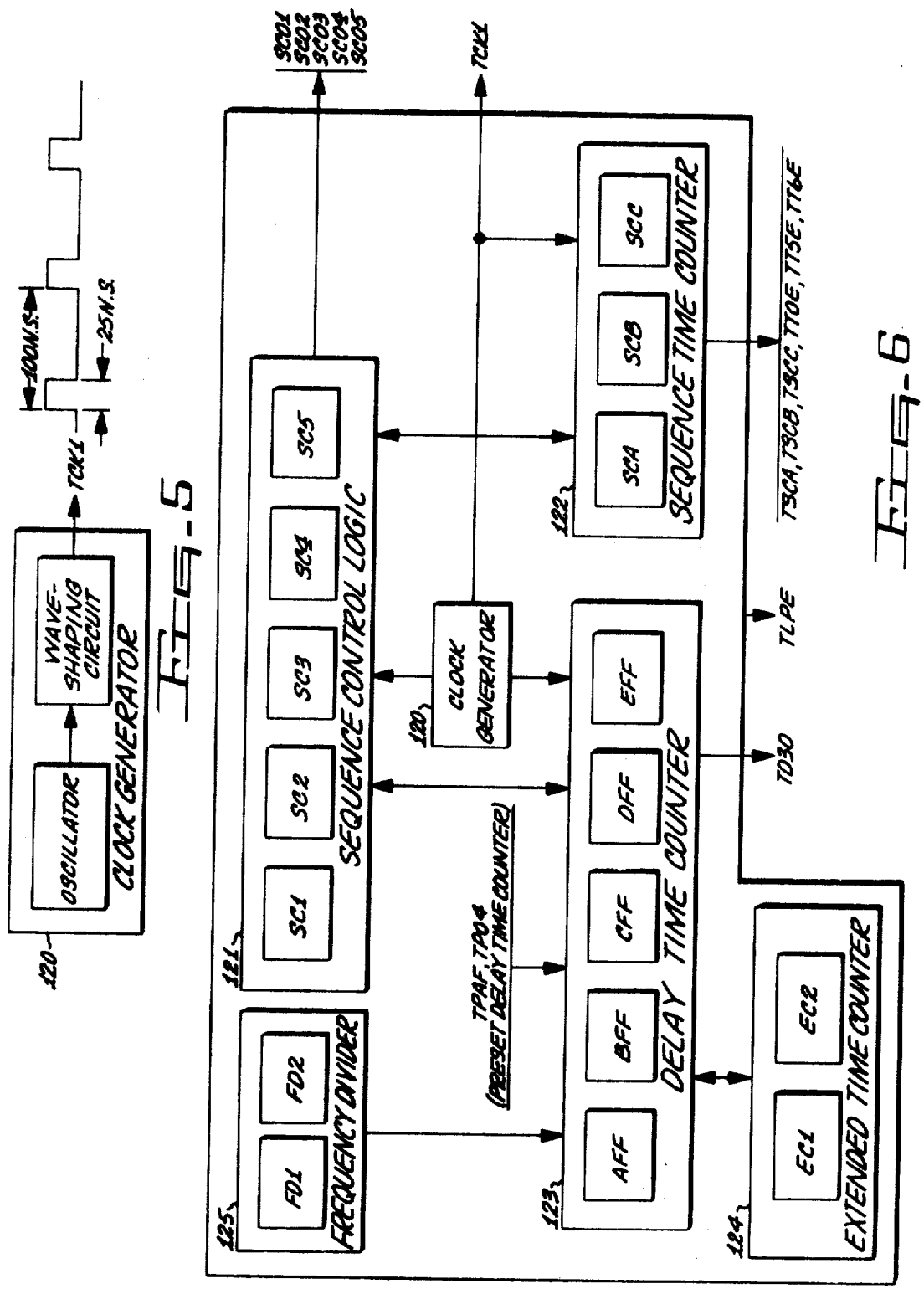

MEMORY MAP

FIG. 7

| MEMORY LOCATION | VOLUME PROTECTED BY STORED STATUS WORD |
|---|---|
| $00100_8$ | $V_1$ |
| $00101_8$ | $V_2$ |
| $00102_8$ | $V_3$ |
| $00103_8$ | $V_4$ |
| $00104_8$ | $V_5$ |
| $00105_8$ | $V_6$ |
| $00106_8$ | $V_7$ |
| $00107_8$ | $V_8$ |
| $00110_8$ | $V_9$ |
| $00111_8$ | $V_{10}$ |
| $00176_8$ | $V_{63}$ |
| $00177_8$ | $V_{64}$ |

SYSTEM PROTECTION STATUS WORD

MEMORY PROTECTION STATUS WORD TRANSFER FROM
B-REGISTER 100 TO L-REGISTER 105

SYSTEM PROTECTION LOGIC

Fig. 12

MA14 = FI14 SAMI + FP14 SAMP

MA13 = FI13 SAMI + FP13 SAMP

MA12 = FI12 SAMI + FP12 SAMP

MA11 = FI11 SAMI + FP11 SAMP

MA10 = FI10 SAMI + FP10 SAMP

MA09 = FI09 SAMI + FP09 SAMP

LOGICAL SCHEMATIC DIAGRAMS
LOGIC GATES 150

*FIG. 13*

MA08 = FI08 SAMI + FP08 SAMP

MA07 = FI07 SAMI + FP07 SAMP

MA06 = FI06 SAMI + FP06 SAMP + MAMV

LOGICAL SCHEMATIC DIAGRAMS
LOGIC GATES 151

*FIG. 14*

MA05 = FI05 SAMI + FP05 SAMP + FV05 MAMV

MA04 = FI04 SAMI + FP04 SAMP + FV04 MAMV + MTRP (SC01 + SC05)

MA03 = FI03 SAMI + FP03 SAMP + FV03 MAMV

MA02 = FI02 SAMI + FP02 SAMP + FV02 MAMV

MA01 = FI01 SAMI + FP01 SAMP + FV01 MAMV

MA00 = FI00 SAMI + FP00 SAMP + FV00 MAMV + SC05 MTRP

LOGICAL SCHEMATIC DIAGRAMS
LOGIC GATES 152

*FIG. 15*

FV05 = MA14 MTAV
$\overline{\text{FV05}}$ = $\overline{\text{MA14}}$ MTAV

FV04 = MA13 MTAV
$\overline{\text{FV04}}$ = $\overline{\text{MA13}}$ MTAV

FV03 = MA12 MTAV
$\overline{\text{FV03}}$ = $\overline{\text{MA12}}$ MTAV

FV02 = MA11 MTAV
$\overline{\text{FV02}}$ = $\overline{\text{MA11}}$ MTAV

FV01 = MA10 MTAV
$\overline{\text{FV01}}$ = $\overline{\text{MA10}}$ MTAV

FV00 = MA09 MTAV
$\overline{\text{FV00}}$ = $\overline{\text{MA09}}$ MTAV

LOGICAL SCHEMATIC DIAGRAMS
V-REGISTER 104

FIG. 16

MF13 = $\overline{\text{MTRP}}$ $\overline{\text{MAMV}}$ MTRM $\overline{\text{SPI1}}$ MF14 = SAMI $\overline{\text{SC01}}$ $\overline{\text{SPI2}}$ MF17

$\overline{\text{MXAQ}}$ = $\overline{\text{XEXC}}$ $\overline{\text{XQUA}}$

MSSI = $\overline{\text{MVDF}}$ $\overline{\text{MAMV}}$ $\overline{\text{MFVL}}$ STOR = $\overline{\text{MFVL}}$ $\overline{\text{MVDA}}$ MTRM SC04 DSTA
 + SC04 DSTA ($\overline{\text{MTRM}}$ + $\overline{\text{MF17}}$)

FTRM = MSTM TLPE $\overline{\text{FTRM}}$ = MRTM TLPE

MTRM = FTRM

LOGICAL SCHEMATIC DIAGRAMS
MISCELLANEOUS SIGNALS

FIG. 17

$\overline{MCM1} = \overline{FV05}\ MA14 + FV05\ \overline{MA14} + \overline{FV04}\ MA13 + FV04\ \overline{MA13}$ $\overline{MCM2} = \overline{FV03}\ MA12 + FV03\ \overline{MA12} + \overline{FV02}\ MA11 + FV02\ \overline{MA11}$ $\overline{MCM3} = \overline{FV01}\ MA10 + FV01\ \overline{MA10} + \overline{FV00}\ MA09 + FV00\ \overline{MA09}$

LOGICAL SCHEMATIC DIAGRAMS
LOGIC GATES 155

FIG. 18

$MVDF = (\overline{MCM1} + \overline{MCM2} + \overline{MCM3})\ MF13\ (MF14 + SC01\ \overline{MXAQ})$

LOGICAL SCHEMATIC DIAGRAM
LOGIC GATE 165

FIG. 19

MTAV = MVDF MRLS

FAMV = MVDF TLPE TCK1

$\overline{FAMV}$ = TLPE

MAMV = FAMV

MLSR = MAMV TSCB

MVDA = MVDF + MAMV

MAL1 = MAMV MRLS

LOGICAL SCHEMATIC DIAGRAMS
VOLUME DIFFERENCE LOGIC 168

FIG. 20

$FL15 = MLSR\ TCK1$
$\overline{FL15} = \overline{U22S}\ MAL1\ TCK1$ $FL14 = MLSR\ TCK1$
$\overline{FL14} = \overline{U21S}\ MAL1\ TCK1$ $FL13 = MLSR\ TCK1$
$\overline{FL13} = \overline{U19S}\ MAL1\ TCK1$ $FL12 = MLSR\ TCK1$
$\overline{FL12} = \overline{U18S}\ MAL1\ TCK1$ $FL11 = MLSR\ TCK1$
$\overline{FL11} = \overline{U16S}\ MAL1\ TCK1$ $FL10 = MLSR\ TCK1$
$\overline{FL10} = \overline{U15S}\ MAL1\ TCK1$ $FL09 = MLSR\ TCK1$
$\overline{FL09} = \overline{U13S}\ MAL1\ TCK1$ $FL08 = MLSR\ TCK1$
$\overline{FL08} = \overline{U12S}\ MAL1\ TCK1$ $FL07 = MLSR\ TCK1$
$\overline{FL07} = \overline{U10S}\ MAL1\ TCK1$ $FL06 = MLSR\ TCK1$
$\overline{FL06} = \overline{U09S}\ MAL1\ TCK1$ $FL05 = MLSR\ TCK1$
$\overline{FL05} = \overline{U07S}\ MAL1\ TCK1$ $FL04 = MLSR\ TCK1$
$\overline{FL04} = \overline{U06S}\ MAL1\ TCK1$ $FL03 = MLSR\ TCK1$
$\overline{FL03} = \overline{U04S}\ MAL1\ TCK1$ $FL02 = MLSR\ TCK1$
$\overline{FL02} = \overline{U03S}\ MAL1\ TCK1$ $FL01 = MLSR\ TCK1$
$\overline{FL01} = \overline{U01S}\ MAL1\ TCK1$ $FL00 = MLSR\ TCK1$
$\overline{FL00} = \overline{U00S}\ MAL1\ TCK1$

L-REGISTER

FIG. 21

M31X = FL15 MA06 MA07 MA08 + FL13 $\overline{MA06}$ MA07 MA08

M3X1 = FL14 MA06 MA07 MA08 + FL12 $\overline{MA06}$ MA07 MA08

LOGICAL SCHEMATIC DIAGRAMS
LOGIC GATES 160

FIG. 22

M21X = FL11 MA06 $\overline{MA07}$ MA08 + FL09 $\overline{MA06}$ $\overline{MA07}$ MA08

M2X1 = FL10 MA06 $\overline{MA07}$ MA08 + FL08 $\overline{MA06}$ $\overline{MA07}$ MA08

LOGICAL SCHEMATIC DIAGRAMS
LOGIC GATES 161

FIG. 23

M11X = FL07 MA06 MA07 $\overline{MA08}$ + FL05 $\overline{MA06}$ MA07 $\overline{MA08}$ M1X1 = FL06 MA06 MA07 $\overline{MA08}$ + FL04 $\overline{MA06}$ MA07 $\overline{MA08}$

LOGICAL SCHEMATIC DIAGRAMS
LOGIC GATES 162

FIG. 24

M01X = FL03 MA06 $\overline{MA07}$ $\overline{MA08}$ + FL01 $\overline{MA06}$ $\overline{MA07}$ $\overline{MA08}$ M0X1 = FL02 MA06 $\overline{MA07}$ $\overline{MA08}$ + FL00 $\overline{MA06}$ $\overline{MA07}$ $\overline{MA08}$

LOGICAL SCHEMATIC DIAGRAMS
LOGIC GATES 163

MLX1 = M3X1 + M2X1 + M1X1 + M0X1

LOGICAL SCHEMATIC DIAGRAMS
LOGIC GATES 170

FIG. 26

ML11 = ML1X MLX1

ML00 = $\overline{ML1X}$ $\overline{MLX1}$

ML01 = $\overline{ML1X}$ MLX1

LOGICAL SCHEMATIC DIAGRAMS
LOGIC GATES 172, 173 AND 174

FIG. 27

MF04 = SC01 (WD01 $\overline{MTRP}$ TT5E + MTRM $\overline{MTRP}$ $\overline{MVDA}$ TSCA $\overline{SAMW}$ DGN2)

MF03 = MF17 MF09 ML00 MF06 + MF07 SC01 $\overline{MLX1}$ MF08

MF02 = SC04 ML01 MF10 MF09 + MF09 MF12 MF18 $\overline{ML1X}$

MF01 = SC04 MF17 ML00 MF09

LOGICAL SCHEMATIC DIAGRAMS
LOGIC GATES 175

FIG. 28

MF18 = SC02 + DSTQ SC03

MF17 = $\overline{XQUA}$ $\overline{FI14}$

MF12 = $\overline{DLDX}$ $\overline{XQUA}$ $\overline{FI14}$

MF10 = DSTA $\overline{XQUA}$ $\overline{FI14}$

MF09 = MTRM $\overline{MVDF}$ $\overline{SPI2}$ $\overline{MPXN}$ (SAMI + SAMP)

MF08 = $\overline{MXAQ}$

MF07 = MTRM $\overline{MVDF}$ $\overline{SPI2}$ $\overline{MPXN}$ (SAMI + SAMP)

MF06 = SC03 + DLDX SC02

LOGICAL SCHEMATIC DIAGRAMS

LOGIC GATES 180

FIG. 29

MFVL = MF01 + MF02 + MF03 + MF04

LOGICAL SCHEMATIC DIAGRAM

LOGIC GATE 185

FIG. 30

MFVL = MTRM $\overline{\text{MVDF}}$ $\overline{\text{SPI2}}$ $\overline{\text{MPXN}}$ (SAMI + SAMP)

[$\overline{\text{XQUA}}$ $\overline{\text{FI14}}$ (ML00 SC04 + ML00 (SC03 + DLDX SC02)

+ ML01 DSTA SC04

+ $\overline{\text{MLIX}}$ (SC02 + DSTQ SC03) $\overline{\text{DLDX}}$)

+ $\overline{\text{MLX1}}$ $\overline{\text{MXAQ}}$ SC01]

+ MTRM $\overline{\text{MVDA}}$ DGN2 SC01 TSCA $\overline{\text{SAMW}}$ $\overline{\text{MTRP}}$ + WD01 $\overline{\text{MTRP}}$ SC01 TT5E

LOGICAL SCHEMATIC DIAGRAM
CONDITIONS FOR SYSTEM PROTECTION VIOLATION

FIG. 31

FTRP = MFVL TLPE $\overline{\text{FTRP}}$ = MRTM TLPE

MTRP = FTRP

LOGICAL SCHEMATIC DIAGRAM
TRAP LOGIC 190

FIG. 33

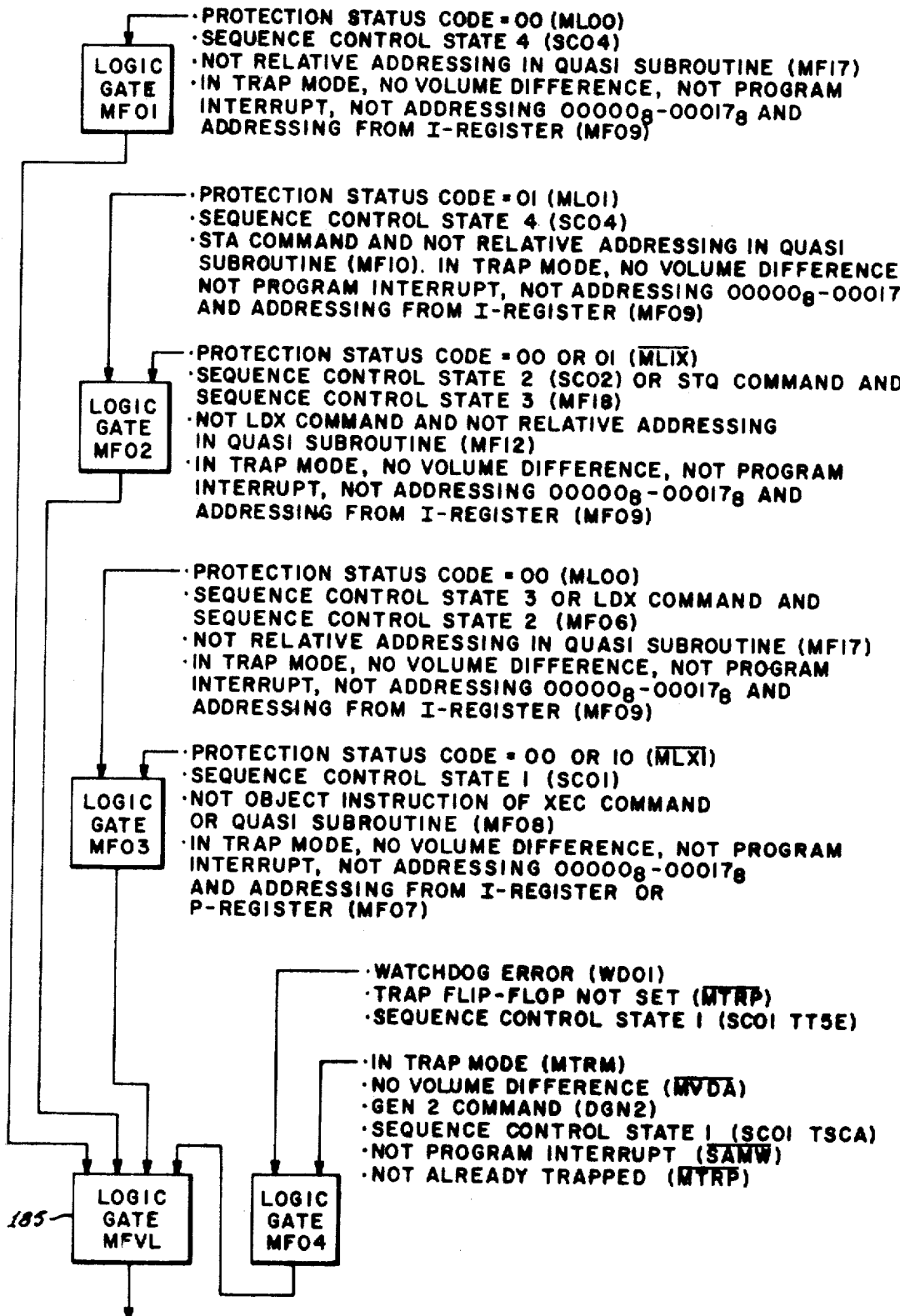

MEMORY MAP

INFORMATION TRANSFER-VOLUME DIFFERENCE

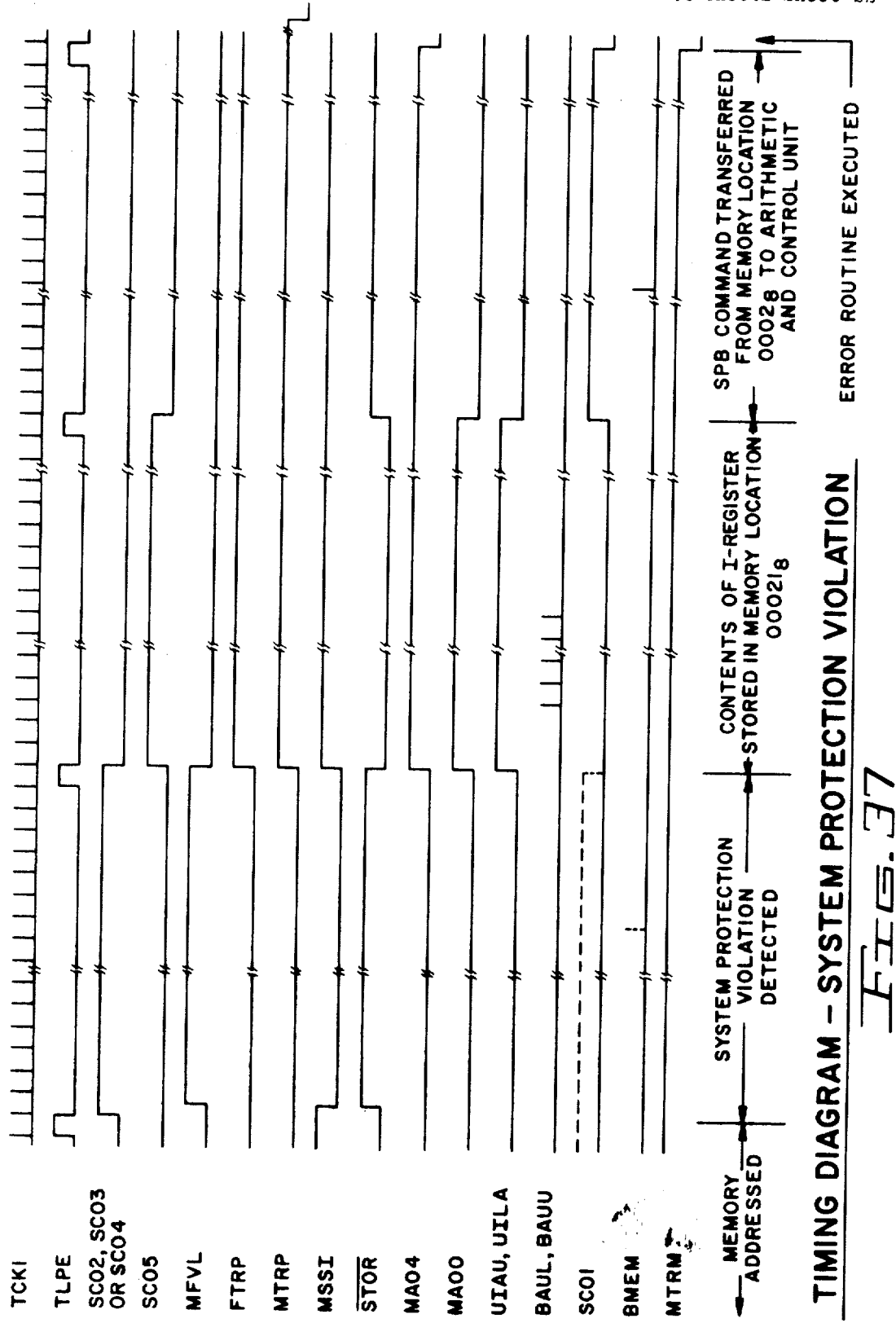
Fig. 37 TIMING DIAGRAM – SYSTEM PROTECTION VIOLATION

FLOW DIAGRAM - SYSTEM PROTECTION

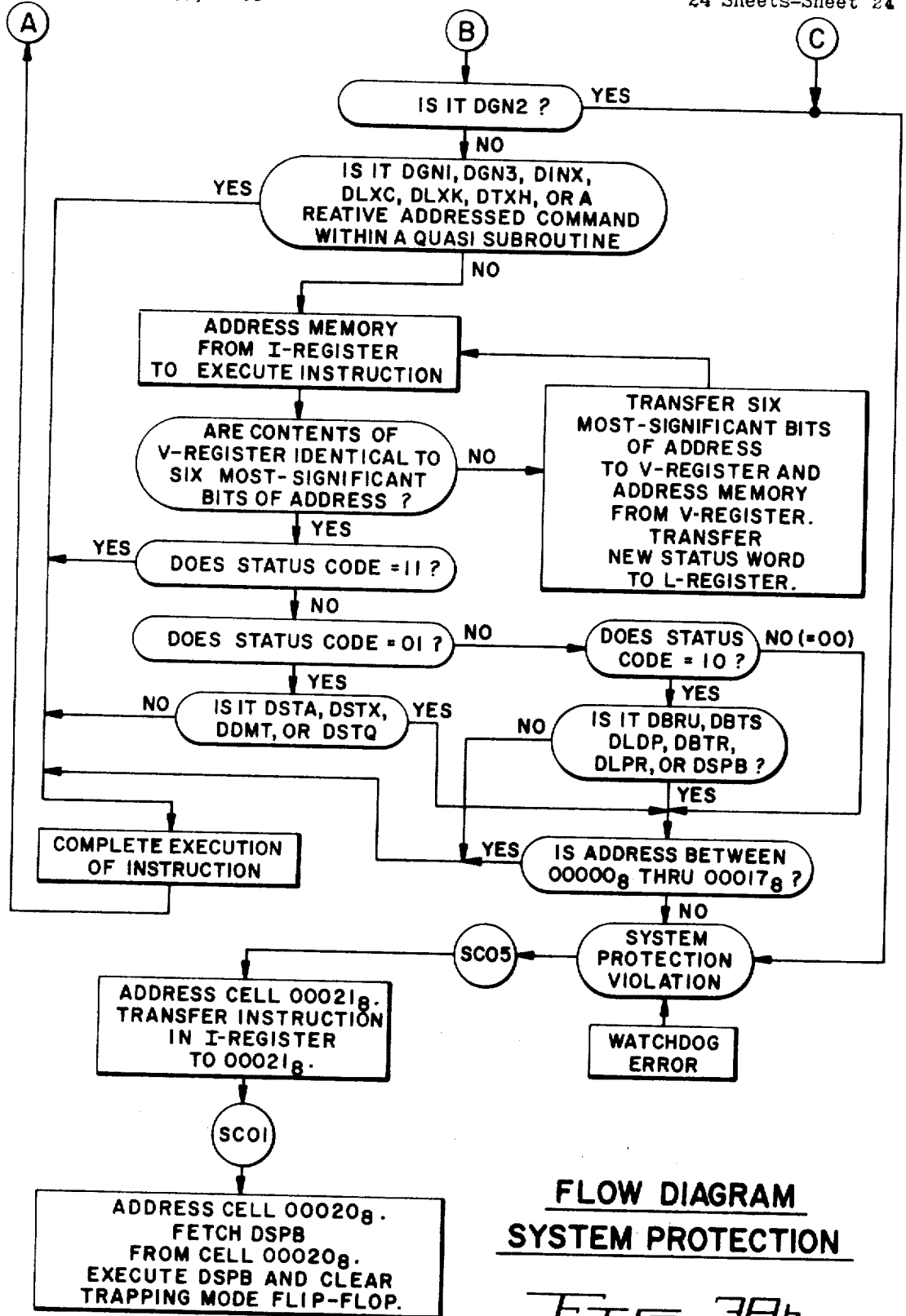

United States Patent Office 3,562,717
Patented Feb. 9, 1971

3,562,717
SYSTEM PROTECTION APPARATUS
Sherril A. Harmon, Wallace N. Patterson, and Emery A. White, Phoenix, Ariz., assignors to General Electric Company, a corporation of New York
Filed Feb. 23, 1968, Ser. No. 707,564
Int. Cl. G06f 11/00
U.S. Cl. 340—172.5                                      8 Claims

ABSTRACT OF THE DISCLOSURE

Apparatus in a computer system for protecting operating programs and related data stored in the computer memory and for preventing unauthorized actions in the system while an undebugged program is being executed by the system. A status register is provided in the system arithmetic unit for storing a system protection status word. Another register is provided to identify the group or volume of memory storage locations whose protection status is defined by the status word in the status register. Each time memory is addressed, the status word applicable to the addressed memory storage location is checked. The status word defines one of a plurality of protection states for the addressed memory storage location. Logic gates are provided which are responsive to the protection status word, to the type of operation for which memory is being addressed, and to other conditions to determine if a system protection violation has occurred. Upon detection of a system protection violation, access to the addressed memory location is inhibited and execution of an error routine is initiated.

BACKGROUND OF THE INVENTION

Field of the invention

This invention relates to computer systems for processing information and, more particularly, to apparatus for safely permitting undebugged programs to be executed in a computer system without endangering the operating programs and related data stored in the computer memory and without allowing unauthorized actions in the system. Specifically, the invention relates to system protection apparatus for restricting the use of memory by an undebugged program in order to protect and preserve the integrity of operating programs and related data stored in memory and for restricting the initiation of communications with external devices by an undebugged program.

Description of the prior art

It is often desirable in computer systems to execute one program while a second program and its related data are stored in memory. For example, in a process computer system utilizing debugged operating programs to control or monitor a process, complete utilization of the computer's capability may not be attained because the controlled process may not require one hundred percent of the computer's time. However, the computing capacity must be available if needed. The capacity not utilized by the process, termed the computer free time, is often employed to execute undebugged programs. During execution of an undebugged program, the operating programs and associated data employed to control or monitor the process must be protected.

Prior art memory protection arrangements have employed one bit position of each memory storage location to designate the status of that location, identifying it as being either available or unavailable to the undebugged program being executed. Such an arrangement is relatively inefficient because it utilizes a large proportion of the total available memory storage capacity to store the memory protect information. Other protection arrangements have also been employed but these too have not been entirely satisfactory. Accordingly, it is desirable ot provide the protection arrangement having greater efficiency and greater flexibility.

It is therefore an object of this invention to provide an improved protection arrangement in a computer system.

It is another object of this invention to provide a more flexible arrangement in a computer system for protecting the system against unauthorized actions initiated by undebugged programs.

It is a further object of this invention to provide a system protection arrangement in a computer system having improved efficiency and flexibility of application.

SUMMARY OF THE INVENTION

The foregoing objects are achieved, in acordance with the illustrated embodiment of the invention, by providing a protection status word for each group or volume of 512 storage locations of memory. Each volume is in turn divided into eight 64-word blocks and different bit positions of the protection status word applicable to the volume define the protection status of each 64-word block. The protection status words are stored in designated locations in memory. A status word register, designated the L-Register, is provided in the arithmetic unit for storing a protection status word. Another register, designated the V-Register, is provided to store six bits identifying the volume to which the status word in the L-Register is applicable. A flip-flop is provided and assumes a predetermined state when an undebugged program is being executed, to define the system protection mode. Each time that memory is addressed from either the I-Register or the P-Register of the arithmetic unit during the system protection mode, the six most-significant bits of the address are compared to the contents of the V-Register to determine if the correct status word is stored in the L-Register. If the comparison shows dissimilarity, indicated by generation of signal MVDF, the six most-significant bits of the address are transferred to the V-Register and memory is addressed form the V-Register to transfer the system protection status word applicable to the addressed memory location from memory to the L-Register.

The memory address is utilized to select the applicable bit positions of the status word in the L-Register. The selected status bits are decoded and applied to logic gates which also receive information indicating the purpose for which memory is being addressed, i.e. instruction fetch or instruction execution, and if an instruction is being executed, its identity, the sequence control state in which the system is operating, the existence of a program interrupt and other system conditions. The logic determines whether an unauthorized operation is being attempted which constitutes a system protection violation. If a system protection violation has occurred, signal MFVL issues, causing the contents of the I-Register to be automatically stored in a designated memory location. In lieu of the normal instruction fetch operation, the contents of another designated memory location are automatically transferred to the arithmetic unit to initiate corrective action.

The bit positions of the status words assigned to each 64-word block of memory are capable of defining at least four protect states, viz accessible, not accessible, accessible for read or instruction fetch only, or accessible for read or write only but not instruction fetch. Instructions which cannot affect the contents of protected areas in memory are permitted to be executed without exception. For the majority of the instructions, system protection violations depend upon the particular instruction being executed, the protect status of the addressed memory location and other conditions in the system. System protection violations are indicated in response to any instructions which would normally initiate input/output operations, i.e., transfers between memory and a peripheral subsystem of the computer system. In order to insure freedom of action of the operating programs in responding to requirements of the controlled or monitored process, the system leaves the protection mode automatically in response to a program interrupt.

BRIEF DESCRIPTION OF THE DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

FIG. 1 is a block diagram of a computer system to which the instant invention is applicable;

FIG. 4 is a block diagram illustrating the information storage elements, the information control signal transfer paths between these elements, and the major control elements of the computer system of FIG. 1;

FIG. 5 is a block diagram illustrating the organization of the clock generator employed in the computer system of FIG. 1 and illustrating the wave form of the basic clock signal provided by the clock generator for use in the system;

FIG. 6 is a block diagram illustrating the details of the timing control unit of the arithmetic and control unit of the system of FIG. 1;

FIG. 7 illustrates diagrammatically the organization of the memory of the computer system of FIG. 1 in accordance with the system protection arrangement of the invention;

FIG. 12 is a block diagram illustrating the primary information storage and logic elements of the system protection arrangement of the invention;

FIG. 13 comprises logical combination signal diagrams illustrating the structure of logic gates MA14–MA09 employed in the system protection arrangement of FIG. 12;

FIG. 14 comprises logical combination signal diagrams illustrating the structure of logic gates MA08–MA06 employed in the system protection arrangement of FIG. 12;

FIG. 15 comprises logical combination signal diagrams illustrating the logical structure of logic gates MA05–MA00 employed in the system protection arrangement of FIG. 12;

FIG. 16 comprises flip-flop input diagrams of the V-Register employed in the protection apparatus of FIG. 12;

FIG. 17 comprises logical schematic diagrams illustrating the generation of miscellaneous signals employed in conjunction with the protection apparatus of FIG. 12;

FIG. 18 comprises logical combination signal diagrams illustrating the structure of gates MCM1–MCM3 of the protection apparatus of FIG. 12;

FIG. 19 is a logical combination signal diagram illustrating the structure of logic gate MVDF of the protection apparatus of FIG. 12;

FIG. 20 comprises logical schematic diagrams illustrating the structure of the volume difference logic in the protection apparatus of FIG. 12;

FIG. 21 comprises flip-flop input diagrams illustrating the structure of the L-Register in the protection apparatus of FIG. 12;

FIG. 22 comprises logical combination signal diagrams illustrating the structure of logic gates M31X–M3X1 in the arrangement of FIG. 12;

FIG. 23 comprises logical combination signal diagrams illustrating the structure of gates M21X–M2X1 in the arrangement of FIG. 12;

FIG. 24 comprises logical combination signal diagrams illustrating the structure of gates M11X–M1X1 in the arrangement of FIG. 12;

FIG. 25 comprises logical combination signal diagrams illustrating the structure of logic gates M01X–M0X1 in the arrangement of FIG. 12;

FIG. 26 comprises logical combination signal diagrams illustrating the structure of gates ML1X–MLX1 in the arrangement of FIG. 12;

FIG. 27 comprises logical combination signal diagrams illustrating the structure of gates ML11, ML00 and ML01 in the arrangement of FIG. 12;

FIG. 28 comprises logical combination signal diagrams illustrating the structure of gates MF04–MF01 in the arrangement of FIG. 12;

FIG. 29 comprises logical combination signal diagrams illustrating the structure of gates MF18, MF17, MF12 and MF10–MF06 in the arrangement of FIG. 12;

FIG. 30 comprises a logical combination signal diagram illustrating the structure of gate MFVL in the system protection arrangement of FIG. 12;

FIG. 31 comprises a logical combination signal diagram illustrating the conditions for system protection violation which result in the enabling of gate MFVL in the arrangement of FIG. 12;

FIG. 32 illustrates diagrammatically the conditions for system protection violation;

FIG. 33 is a logical schematic diagram illustrating the structure of the trap logic in the arrangement of FIG. 12;

FIG. 37 is a timing diagram illustrating the timing sequence of signals in the system and the system protection arrangement of the invention in response to a system protection violation; and FIGS. 38a and 38b are flow diagrams illustrating the operation of the system protection arrangement of the invention.

DESCRIPTION OF THE PREFERRED EMBODIMENT

Computer system—general

Figure 2A:
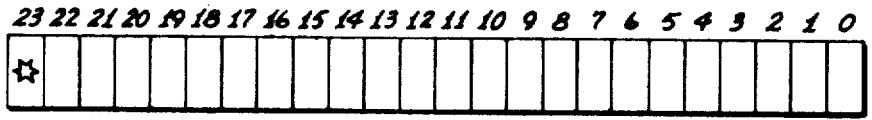
FIGS. 2a–2e are symbolic diagrams illustrating the organization of various types of word formats employed in the computer system of FIG. 1.

FIG. 1 illustrates diagrammatically a typical computer system organized to control or monitor a process. The major units of the computer system are Arithmetic and Control Unit 10, Memory 11 comprising Memory Multiplexer 12 and Magnetic Core Storage Unit 13, Bulk Storage Memory 14, which may comprise a disc or drum storage unit, Automatic Program Interrupt Unit 15, Input/Output Expander 18, Peripheral Input/Output Buffer 16, Peripheral Devices 17, Analog Input Scanner 19, Digital Input Scanner 20, Multiple Output Distributor 21 and Computer Console 22. Peripheral Devices 17, connected to Peripheral Input/Output Buffer 16, may include, for example, an input/output typer, a logging typer, an alarm typer, a tape or card punch and a tape or card reader. A Peripheral Controller 23 may also be connected to Memory Multiplexer 12 with Peripheral Devices 24 communicating with Memory 11 through Peripheral Controller 23. Peripheral Devices 24 may include, for example, data links, high-speed printers, card readers, card punches, magnetic tape units, or disc storage units. The lines interconnecting the various units illustrated in FIG. 1 represent symbolically paths of information and control signal transfer in the computer system.

The computer system responds to a plurality of distinct instructions which are supplied in the sequential order necessary to perform particular processing, control and monitoring functions. Magnetic Core Storage Unit 13 of Memory 11 stores data words which are to be processed, data words which are the result of processing, data words representing process parameters and other process information, instruction words and auxiliary words for addressing and control. Memory Multiplexer 12 includes control circuitry to permit transfer of information between Magnetic Core Storage Unit 13 and Arithmetic and Control Unit 10, Bulk Storage Memory 14 and Peripheral Controller 23.

Bulk Storage Memory 14 may comprise drum or disc storage units or magnetic tape storage units used for storing large quantities of information or instruction routines which can be transferred to Magnetic Core Storage Unit 13 as required for use in the computer system.

Arithmetic and Control Unit 10 controls the sequence of events required for instruction execution in the computer system, performs binary arithmetic operations, and serves as a path for transfer of information between Memory 11 and Peripheral Input/Output Buffer 16 and Input/Output Expander 18. Arithmetic and Control Unit 10 contains the logical elements necessary to access Memory 11 and to perform all operations required for instruction execution. Arithmetic and Control Unit 10 communicates with Memory 11 to obtain instruction words, auxiliary words, data words on which operations are to be performed, to store data words on which operations have been performed, to obtain or store data words representing process parameters and other process information and to obtain control signals for synchronizing the timing of Arithmetic and Control Unit 10 with operations in Memory 11.

Peripheral Input/Output Buffer 16 communicates with Arithmetic and Control Unit 10 through Input/Output Expander 18 and serves as a data buffer, translater, and sequencer for Peripheral Devices 17. Peripheral Input/Output Buffer 16 includes a plurality of channels, each connected to one of Peripheral Devices 17 to handle the data transfers between Memory 11 and that device. A plurality of Peripheral Input/Output Buffers may be provided to communicate with Arithmetic and Control Unit 10 through Input/Output Expander 18 when the peripheral device requirements of a specific system exceed the capacity of a single Peripheral Input/Output Buffer.

Input/Output Expander 18 is a communication link between Arithmetic and Control Unit 10 and Peripheral Input/Output Buffer 16 and between Arithmetic and Control Unit 10 and the input and output devices connected to the control and/or monitored process. Input/Output Expander 18 is connected to Arithmetic and Control Unit 10 through I/O Bus 25. Input/Output Expander 18 serves as a multiplexer for digital and analog inputs from the process and as a multiplexer and amplifier for output signals to the process. Signal inputs may be from contact closures, pulse generators, or measuring devices. Input/Output Expander 18 communicates corrective or alarm information to the process to change the process control variables or to activate the proper alarm devices or displays. A plurality of Input/Output Expanders may be connected to Arithmetic and Control Unit 10 if the requirements of the system exceed the capacity of a single Input/Output Expander. Arithmetic and Control Unit 10 employs the control information stored in Memory 11 to decide whether control or alarm actions are required and provides the necessary control or alarm information to Input/Output Expander 18. Input/Output Expander 18 also provides a transfer path for information transmitted between Arithmetic and Control Unit 10 and Peripheral Input/Output Buffer 16.

Analog Input Scanner 19 selects and amplifies process analog sensor signals and also converts analog information into a digital form compatible with that used in Arithmetic and Control Unit 10 and other system elements. The digital output signals of Analog Input Scanner 19 are transmitted to Arithmetic and Control Unit 10 through Input/Output Expander 18.

Digital Input Scanner 20 selects and conditions, by filtering, amplifying and attenuating, contact or digital process inputs. The output signals of Digital Input Scanner 20 are applied to Arithmetic and Control Unit 10 through Input/Output Expander 18. Multiple Output Distributor 21 receives digital, decimal and analog outputs from Input/Output Expander 18 and transmits this information to the controlled and/or monitored process and to operator displays.

Automatic Program Interrupter Unit 15 detects and identifies program interrupt signals from Peripheral Input/Output Buffer 16 and Peripheral Controller 23 indicating that a peripheral device is ready to perform a data transfer. Automatic Program Interrupt Unit 15 also detects signals which indicate condition changes in the controlled and/or monitored process. Upon detection of interrupt request signals, Automatic Program Interrupt Unit 15 causes a word to be transferred to Arithmetic and Control Unit 10 from the memory location identified by the memory address supplied by Automatic Program Interrupt Unit 15, corresponding to the highest-priority interrupt request present at that time. This word may be a single instruction word or the first instruction of a subroutine, or may be a control word for directing an information transfer with a peripheral device.

Computer Console 22 provides a communication path between the operator and computer system for programming and maintenance. In addition, Computer Console 22 is provided with visual displays illustrating the instantaneous states of various registers and elements within Arithmetic and Control Unit 10 to aid the operator in monitoring system and program performance.

INFORMATION REPRESENTATION

The computer system of FIG. 1 stores and processes information represented by the binary code. In the binary code each element of information is represented by a binary digit, sometimes termed a "bit," each binary digit being either a "1" or a "0." In the computer system, a binary "0" is represented by a potential of approximately 0 volts or ground while a binary "1" is represented by a positive potential relative to ground. The fundamental unit of information employed in processing and communication in the described system is the word, each word comprising 24 binary digits. The first binary digit or bit of a data word is termed the most-significant digit (MSD) of the word and is designated as bit 23. The last binary digit of the word is termed the least-significant digit (LSD) of the word and is designated as bit 0. The binary digits between bits 23 and 0 are accorded successively decreasing order of significance.

Three general categories of words are employed in the computer system of FIG. 1, viz.: (1) data words, (2) instruction words, and (3) auxiliary words for address and control. Auxiliary words are of the following types:
(a) index word
(b) TIM/TOM control word The organization of each type of word is illustrated in FIGS. 2a–2e.

Data Words

Data in the computer system of FIG. 1 is in fixed-point binary form. Each binary data word represents a single number. The binary digit in bit position 23 of the data word, termed bit 23, identifies the sign of the binary data word. The organization of a binary data word is illustrated in FIG. 2a. Bit 23 is the MSD and bit 0 is the LSD of the binary data word. Bit 0 of the binary data word thus represents $2^0$ and is equal to the decimal number 1, if bit 0 is a binary 1. Bit 1 represents $2^1$ and is equal to the decimal number 2 if bit 1 is a binary 1. Bit 5 represents $2^5$ and is equal to the decimal number 32, if bit 5 is a binary 1. Thus, in general, the $(i)$th bit of the binary data word represents $2^i$ if the $(i)$th bit is a binary 1. The $(i)$th bit represents 0 if the bit is a binary 0. During information transfers between Memory 11 and certain peripheral devices, the binary data words being transferred are selectively divided into 2 bytes of 12 bits each, 3 bytes of 8 bits each or 4 bytes of 6 bits each.

Positive binary data words are stored and operated upon in true binary while negative binary data words are stored and operated upon in two's complement form. The two's complement of a binary number is its one's complement increased by one. The one's complement of a binary number is the number which results when each binary 1 in the number is replaced by a binary 0 and each binary 0 is replaced by a binary 1. For convenience, a binary word may be core compactly represented by a series of "octal" digits in which each octal digit represents three adjacent binary digits.

Instruction Words

Operations for accomplishing processing and control are performed in the computer system under the control of a series of instruction words which are stored in Magnetic Core Storage Unit 13 and executed one at a time. The sequence in which instructions are executed is called the P-Sequence or Program Sequence and is controlled by a counter. Instruction words executed by the computer system of FIG. 1 are of five types, viz. full operand, quasi, Gen I, Gen II and Gen III instructions.

Figure 2B:
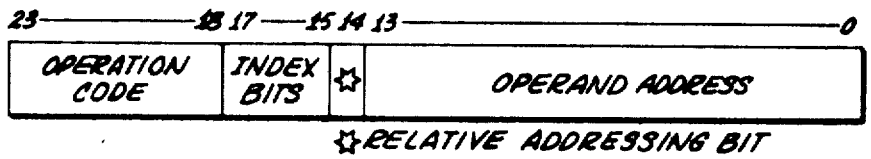

The organization of full operand and quasi instruction words is illustrated in FIG. 2b. Full operand instruction words are most commonly used in the computer system of FIG. 1. These instructions are used to perform arithmetic operations, logical operations, index control operations, and data transfers to and from Memory 11. The operation code of a full operand instruction word (bits 23–18) identifies the operation or program step to be performed. The operand address field (bits 13–0) designates the address of a storage location in Memory 11 from which a word is to be extracted for processing or control or in which a word is to be stored during execution of the instruction.

Quasi instruction words are utilized to initiate quasi subroutines which perform special functions. The address in Memory 11 of the first instruction word in a quasi subroutine is defined by the operation code of the quasi instruction word. The operand address field of the quasi instruction word is stored in memory during execution of the quasi subroutine.

Bits 15–17 of the instruction word illustrated in FIG. 2b are index bits which are employed to indicate whether the operand address of the instruction word is to be modified by an index quantity and, if index modification is specified, the location in memory of the index quantity. If bits 17–15 of an instruction word are all binary 0's, no index modification will occur when the command word is transferred to Arithmetic and Control Unit 10 for execution. If bits 17–15 are any other possible combination (001–111), the operand address of the instruction word will be modified by adding to it the contents of the memory location designated by the index bits ($00001_8$–$00007_8$).

Modification of the operand address of an instruction word may also be effected under control of bit 14, termed the relative addressing bit, of the instruction word. If bit 14 is a binary 1, the final address of the operand is automatically determined in the computer system relative to the address of the instruction being executed. Relative addressing permits the instructions of a program to address other memory locations by specifying the number of memory locations between the instruction location and the desired memory location. Programs so written are easily relocated and executed anywhere in memory.

Figure 2C:

The organization of a Gen I, Gen II or Gen III instruction word is illustrated in FIG. 2c. The operation code of the instruction word (bits 23–18) identifies the instruction as a Gen I instruction, a Gen II instruction or a Gen III instruction. Bits 14–0 comprise a microcoded field which is employed to specify a plurality of sub-operations to be performed under control of the operation code. As with the full operand and quasi instructions, the microcoded field may be modified by an index quantity specified by the index bits 17–15. Gen I commands are used primarily to effect bit manipulation within the principal accumulator or A-Register of Arithmetic and Control Unit 10. Gen II commands are employed within the computer system to (a) select peripheral devices, (b) transfer data to or from these devices, and (c) provide for program control transfers as determined by various internal or external conditions to which the system is responsive. Gen III commands are used to manipulate the contents of the principal accumulator or A-Register and the secondary accumulator or Q-Register and to affect other elements within Arithmetic and Control Unit 10.

Auxiliary Words

The computer system permits address modification to materially reduce total processing time and program memory requirements. During instruction processing, the system follows this general sequence:

(1) The instruction word is obtained from memory.
(2) Any address development specified by the indexing bits or the relative addressing bit is performed.
(3) The instruction is executed.

Figure 2D:
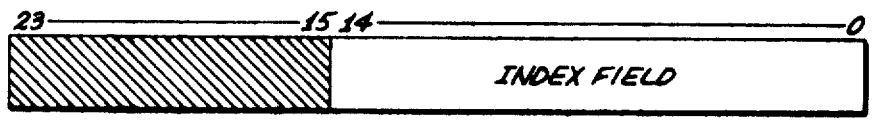

The address development specified by the index bits in step 2 of the above sequence is effected in the computer system by the use of index words. The organization of an index word is illustrated in FIG. 2d. In operand address or microcoded field development employing an index word, the index field (bits 14–0) of the index word is added to the operand address field or microcoded field of the instruction word. The instruction is then executed using the modified operand address or modified microcoded field.

Figure 2E:
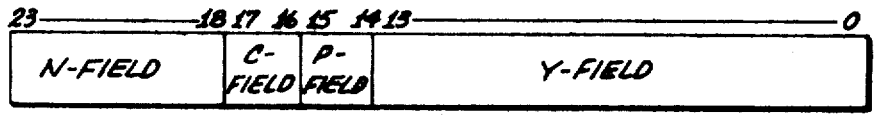

FIG. 2e illustrates another type of auxiliary word, viz. a control word employed in executing a TIM operation for transferring information from a peripheral device to Memory 11 or a TOM operation for transferring information to a peripheral device from Memory 11. The N-Field (bits 23–18) of the control word specifies, in one's complement form, the number of words to be transferred between the corresponding peripheral device and Memory 11. The N-Field may specify up to 63 words. The C-Field (bits 17 and 16) of the control word specifies at any given point in time the number of bytes yet to be transferred between the peripheral device and Memory 11 to complete transfer of the current word. The C-Field is initially set to equal the P-Field. The P-Field (bits 15 and 14) specifies, in two's complement form, the number of bytes, one, two, three or four, in each word transferred between the peripheral device and Memory 11, as follows:

| Bit 15 | Bit 14 | Number of bytes per word |
|---|---|---|
| 0 | 0 | 4 |
| 0 | 1 | 3 |
| 1 | 0 | 2 |
| 1 | 1 | 1 |

The Y-Field (bits 13–0) of the control word initially specifies the starting address less one of the group of memory locations to which or from which data is to be transferred.

SYSTEM CIRCUIT ELEMENTS

The functions of circuits useful as elements of the computer system of FIG. 1 will now be described. Circuits for performing these functions are well known in the art. The following circuits find general employment in the computer system: AND-gates, OR-gates, Inverters, NAND-gates, NOR-gates, Flip-Flops and Full Adders. The symbols illustrated in FIGS. 3a–3g are employed throughout the drawings to represent the corresponding circuits.

AND-Gate

Figure 3A:
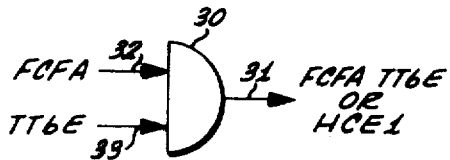
FIGS. 3a–3g illustrate symbols employed to represent circuit elements in the computer system of FIG. 1.

The AND-gate provides the logical operation of conjunction for binary 1 signals applied thereto. Since a binary 1 is represented by a relatively positive potential in the system, the AND-gate provides a positive output signal representing a binary 1 when, and only when, all the input signals applied thereto are positive and represent binary 1's. The symbol identified by reference 30 in FIG. 3a represents a two-input AND-gate. Such an AND-gate delivers a binary 1 output signal on output line 31 only when each of the two input signals applied on respective input lines 32 and 33 are binary 1's.

The two input signals applied to AND-gate 30 of FIG. 3a are designated FCFA and TT6E. The output signal of AND-gate 30 is represented by "FCFA TT6E," a conjunctive logic expression. This form of expression is used in logic equations, which are also termed Boolean equations, and which are often employed to represent a logical structure. The conjunctive operation on two signals, such as the FCFA and TT6E signals, is indicated by writing the two signal designation terms adjacent to each other with no operator notation between them, as written above, or with the operator notation (·) between the terms, as follows: FCFA·TT6E. This conjunctive expression is read as "FCFA and TT6E."

Alternatively, the output of AND-gate 30 may be identified by another signal designation, such as signal designation HCE1 in FIG. 3a. Output HCE1 of AND-gate 30 is a binary 1, therefore, only when both input signals FCFA and TT6E are binary 1's. This relationship between the output signal AND-gate 30, the input signals to AND-gate 30, and the logical operation of conjunction performed by AND-gate 30 may be expressed in the form of a logic equation, viz:

$$FCFA\ TT6E = HCE1$$

This logic equation fully represents the conditions necessary to the generation of output signal HCE1 and may be employed to structurally represent the relationship between signal HCE1 and signals FCFA and TT6E.

The logical operation of conjunction is not limited to AND-gates having only two input signals, but instead is applicable to AND-gates having any number of input signals. In each such instance, the output signal of the corresponding AND-gate represents a binary 1 when, and only when, all of the input signals applied to the gate represent binary 1's.

OR-Gate

The OR-gate provides the logical operation of inclusive-OR for binary 1 input signals applied thereto. In the computer system, since a binary 1 is represented by a relatively positive signal, the OR-gate provides a positive output signal representing a binary 1 when any one or more of the input signals applied thereto are positive and and represent binary 1's. The symbol identified by reference numeral 35 in FIG. 3b represents a two-input OR performed by OR-gate 35 may be expressed in the nal on output line 36 when either or both input signals applied to input lines 37 and 38 represent binary 1's.

Figure 3B:
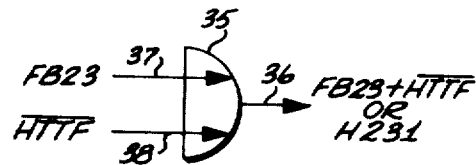

The two input signals applied to OR-gate 35 of FIG. 3b are designated FB23 and $\overline{HTTF}$. The output signal may be represented by "$FB23+\overline{HTTF}$," an inclusive-OR disjunctive logic expression. This form of expression is used in logic equations which may be employed to represent logical structures. The inclusive-OR operation on any two signals, such as the FB23 and $\overline{HTTF}$ signals, is indicated by writing the two signal designation terms adjacent each other with the operator notation (+) between the terms, as written above. This inclusive-OR expression is read as "FB23 or $\overline{HTTF}$."

Alternatively, the output of OR-gate 35 may be identified by another signal designation, such as signal designation H231 in FIG. 3b. Output signal H231 of OR-gate 35 is a binary 1, therefore, when either or both of input signals FB23 and $\overline{HTTF}$ are binary 1's. This relationship between the output signal of OR-gate 35, the input signals to OR-gate 35 and the logical operation of inclusive-OR performed by OR-gate 35 may be expressed in the form of a logic equation as follows:

$$FB23+\overline{HTTF}=H231$$

This logic equation fully represents the conditions necessary to the generation of output signal H231 and may be employed to structurally represent the relationship between signal H231 and signals FB23 and $\overline{HTTF}$.

The logical operation of inclusive-OR is not limited to OR-gates having only two input signals, but instead is applicable to OR gates having any number of input signals. In each such instance, the output signal of the corresponding OR-gate represents a binary 1 when any one or more of the input signals applied to the gate are positive and represent binary 1's.

Inverter

The inverter provides a logical operation of inversion, or NOT, for an input signal applied thereto. The inverter provides a relatively positive output signal, representing a binary 1, when the input signal applied to the inverter is relatively negative, representing a binary 0. Conversely, the inverter provides an output signal representing a binary 0 when the input signal represents a binary 1.

Figure 3C:
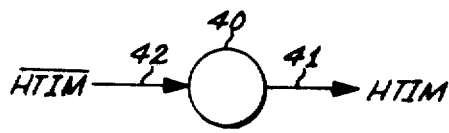

The symbol identified by reference number 40 in FIG. 3c represents an inverter. Inverter 40 delivers a binary 1 output signal on output line 41 when the input signal applied on input line 42 represents a binary 0, and provides a binary 0 output signal on output line 41 when the input signal on line 42 is a binary 1.

The output signal delivered by the inverter is designated as having the inverse binary logical significance of the input signal. The input signal applied to the inverter of FIG. 3c is designated as signal $\overline{HTIM}$. The output signal of this inverter is therefore designated as signal HTIM, which signifies that the output signal has inverse logical significance compared to the input signal.

This designation for a signal having inverse binary logical significance with respect to another signal is employed generally in the description of the system. Thus, a signal designation, such as $\overline{DNDP}$, indicates that when the DNDP signal is relatively positive, representing a binary 1, the $\overline{DNDP}$ signal is relatively negative, representing a binary 0, and vice versa. It is to be understood herein that whenever a particular signal is generated, its logical inverse may be generated by applying the original signal to an inverter.

NAND-Gate

Figure 3D:
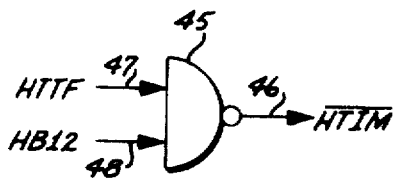

The NAND-gate provides the logical operation of conjunction and inversion for binary 1 siganls applied thereto. In the system, since a binary 1 is represented by a positive signal, the NAND-gate provides a relatively negative output signal representing a binary 0 when, and only when, all of the input signals applied to the NAND-gate are positive, representing binary 1's. The symbol identified by numeral 45 in FIG. 3d represents a two input NAND-gate. Such a NAND-gate delivers a binary 0 output signal on output lead 46 only when each of the two input signals applied to input leads 47 and 48 represents a binary 1. The two input signals applied to NAND-gate 45 are designated HTTF and HB12. The output signal of NAND-gate 45 is designated $\overline{HTIM}$. The logical relation between the output and input signals of NAND-gate 45 may be expressed by the logic equation:

$$\overline{HTTF} \; \overline{HB12} = \overline{HTIM}$$

This logical relation may also be expressed as:

$$\overline{HTTF} + \overline{HB12} = \overline{HTIM}$$

These equations indicate that output signal $\overline{HTIM}$ is a binary 0 when both input signals HTTF and HB12 are binary 1's. Under all other conditions, output signal $\overline{HTIM}$ is a binary 1. The logical relation between the output and input signals of NAND-gate 45 may also be expressed in terms of signal HTIM which has inverse logical significance with respect to signal $\overline{HTIM}$ as follows:

$$HTTF \; HB12 = HTIM$$

This equation indicates that output signal HTIM is a binary 1 when both input signals HTTF and HB12 are binary 1's; this is equivalent to saying that output signal $\overline{HTIM}$ is a binary 0 when both input signals HTTF and HB12 are binary 1's, as previously discussed.

The logical operation of conjunction and inversion is not limited to NAND-gates having only two input signals, but is applicable to NAND-gates having any number of input signals. In each such instance, the output signal of the corresponding NAND-gate represents a binary 0 when, and only when, all of the input signals applied to the NAND-gate represent binary 1's.

NOR-Gate

Figure 3E:
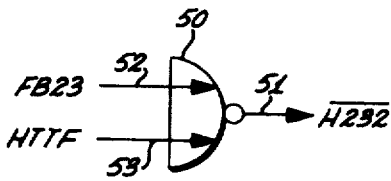

A NOR-gate provides the logical operation of inclusive-or and inversion for binary 1 input signals applied thereto. In the system, since a binary 1 is represented by a positive signal, a NOR-gate provides a relatively negative output signal representing a binary 0 when any one or more of the input signals applied thereto are positive and represent binary 1's. The symbol identified by reference numeral 50 in FIG. 3e represents a two input NOR-gate. Such a NOR-gate delivers a binary 0 output signal on output lead 51 when any one or both of the input signals applied to input leads 52 and 53 represent binary 1's.

The two input signals applied to NOR-gate 50 are designated FB23 and HTTF. The output signal is designated $\overline{H232}$. The logical relationship between the input and output signals of NOR-gate 50 may be represented by the following equation:

$$\overline{FB23} + \overline{HTTF} = \overline{H232}$$

This equation indicates that output signal $\overline{H232}$ is a binary 0 when either of input signals FB23 or HTTF are binary 1's. The equation may also be written as:

$$\overline{FB23} \; \overline{HTTF} = \overline{H232}$$

This equation indicates that $\overline{H232}$ is a binary 1 when both inputs signals $\overline{FB23}$ and $\overline{HTTF}$ are binary 1's, i.e. when both input signals FB23 and HTTF are binary 0's. Under all other conditions, output signal $\overline{H232}$ is a binary 0. The logical relation between the output and input signals of NOR-gate 50 may also be expressed in terms of signal H232 as follows:

$$FB23 + HTTF = H232$$

This equation indicates that output signal H232 is a binary 1 or output signal $\overline{H232}$ is a binary 0 when either of input signals FB23 or HTTF are binary 1's.

The logical operation of inclusive-or and inversion is not limited to NOR-gates having only two input signals, but instead is applicable to NOR-gates having any number of input signals. In each such instance, the output signal of the corresponding NOR-gate represents a binary 0 when any one or more of the input signals applied to the NOR-gate represent binary 1's.

Flip-Flop

The flip-flop provides temporary storage of a binary digit of data or control information. A pair of output signals is delivered by the flip-flop to denote the type of binary digit that is currently being stored.

The flip-flop, or bistable multivibrator, is a circuit adapted to operate in either one of two stable states. The flip-flop may be transferred to one or the other of its states in response to suitable input signals to store information. In one of its stable states (1-state), the flip-flop represents a binary 1 and in the other stable state (0-state), the flip-flop represents a binary 0. When the flip-flop is transferred to the 1-state, it is said to be "set." When the flip-flop is transferred to the 0-state, it is said to be "reset."

Figure 3F:
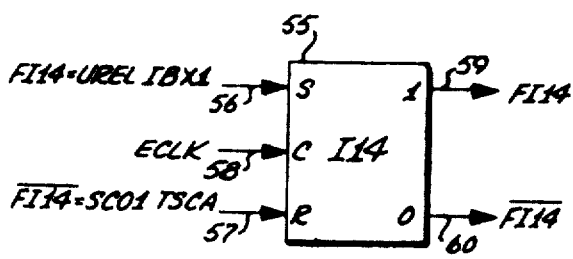
Figure 3G:
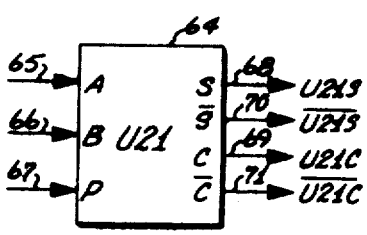

A flip-flop is generally identified mnemonically in accordance with the function it performs. For example, a typical flip-flop employed in the system for control is deisgnated the TTF flip-flop. The TTF designation stands for "TIM/TOM" and the TTF flip-flop, when in the 1-state, indicates that a TIM or a TOM operation is being performed in the system. A typical flip-flop employed in the system for temporary storage of data is the I14 flip-flop. The symbol identified by reference numeral 55 in FIG. 3f is employed to represent a flip-flop. Symbol 55, in this instance, represents the I14 flip-flop.

The I14 flip-flop is employed to temporarily store the fifteenth bit in the I-register. The two lines 56 and 57 entering the left-hand side of the flip-flop symbol are input lines and provide the two required trigger signals. The line 58 entering the left-hand side of the flip-flop is an input line providing the clock signal required to enable a change in state of the flip-flop. Line 56, the one input line, provides a one input (or "set") signal and line 57, the zero input line, provides a zero input (or "reset") signal. When the one input signal increases positively and the clock signal on input line 58 issues, the flip-flop is transferred to its 1-state (or "set" state), if it is not already in the 1-state. When the zero input signal increases positively and the clock signal on input line 58 issues, the flip-flop is transferred to its 0-state (or "reset" state), if it is not already in the 0-state. The notation $FI14 = UREL \; IBX1 \; ECLK$ indicates the logical gate structure employed to generate the "set" trigger signal. Similarly, the notation $$\overline{FI14} = SC01 \; TSCA \; ECLK$$

indicates the logical gate structure employed to generate the "reset" trigger signal for the I14 flip-flop.

The two lines 59 and 60 extending from the right-hand side of symbol 55 are output lines that deliver the two output signals, viz. FI14 identifying the 1-output signal and $\overline{FI14}$ identifying the 0-output signal. When the I14 flip-flop is in the 1-state, a relatively positive signal is delivered on the 1-output line while a relatively negative signal is delivered on the 0-output line. Conversely, when the I14 flip-flop is in the 0-state, a relatively negative signal is delivered on the 1-output line and a relatively positive signal is delivered on the 0-output line. Flip-flop circuits are well known in the art and will not here be described in detail.

Register

A register is a set of flip-flops providing temporary storage for a group of related binary digits of data or control information. The size of a register is dependent on the number of binary digits of information to be stored. For example, the A-Register in the Arithmetic and Control Unit 10 of the computer system is employed to temporarily store an information word and therefore comprises twenty-four flip-flops.

The flip-flops of a register are identified according to the register designation and the numerical significance of the information bits stored therein. Thus, a particular flip-flop of a register may be designated as the "O$i$" flip-flop, where "O" identifies the register and "$i$" identifies the order of significance of the bit stored in the flip-flop. For example, flip-flop A23 stores the twenty-fourth or the most-significant bit stored in the A-Register while flip-flop B00 stores the least-significant bit stored in the B-Register. Data movement between the registers of the system is normally by parallel transfer of the bits stored in the flip-flops of one register to predetermined flip-flops of the receiving register. Data movement may also be accomplished by serial shift of bits between certain registers.

Full Adder

The full adder is employed in the computer system to perform binary arithmetic operations. The symbol identified by reference numeral 64 in FIG. 3$g$ is employed to represent a full adder. Symbol 64, in this instance, represents the U21 full adder. As illustrated in FIG. 3$g$, the full adder receives three input signals on lines 65, 66 and 67 and provides sum and carry output signals S and C on lines 68 and 69 respectively in addition to complementary sum and carry output signals $\bar{S}$ and $\bar{C}$ on lines 70 and 71 respectively. A plurality of full adder circuits may be employed to perform binary arithmetic operations on two data words each comprising a corresponding plurality of binary digits.

If all three inputs to a full adder are binary 0's, the sum and carry output signals S and C are binary 0's, while the complementary signals $\bar{S}$ and $\bar{C}$ are binary 1's. If one of the full adder input signals is a binary 1, the sum output signal S is a binary 1 and the carry output signal C is a binary 0. If two input signals of a full adder are binary 1's, the sum output signal S is a binary 0 and the carry output signal C is a binary 1. If all three input signals to a full adder are binary 1's both the sum and carry output signals are binary 1's. The relationship between the input and output signals of a full adder, such as illustrated in FIG. 3$g$, is represented in the following table:

FULL ADDER CHARACTERISTIC TABLE

| Full-adder inputs | | | Full-adder outputs | | | |
|---|---|---|---|---|---|---|
| A | B | P | S | $\bar{S}$ | C | $\bar{C}$ |
| 0 | 0 | 0 | 0 | 1 | 0 | 1 |
| 0 | 0 | 1 | 1 | 0 | 0 | 1 |
| 0 | 1 | 0 | 1 | 0 | 0 | 1 |
| 0 | 1 | 1 | 0 | 1 | 1 | 0 |
| 1 | 0 | 0 | 1 | 0 | 0 | 1 |
| 1 | 0 | 1 | 0 | 1 | 1 | 0 |
| 1 | 1 | 0 | 0 | 1 | 1 | 0 |
| 1 | 1 | 1 | 1 | 0 | 1 | 0 |

Referring to FIG. 3$g$, sum output signal U21S of full adder 64 is a binary 1 and output signal $\overline{U21S}$ is a binary 0 if either one or three inputs to full adder 64 are binary 1's. In all other instances, output signal U21S is a binary 0 and output signal $\overline{U21S}$ is a binary 1. If either two or three inputs to full adder 64 are binary 1's, carry output signal U21C is a binary 1 and output signal $\overline{U21C}$ is a binary 0. In all other instances, output signal U21C is a binary 0 and output signal $\overline{U21C}$ is a binary 1.

COMPUTER SYSTEM—DETAILS

The computer system is shown symbolically in FIG. 4 to illustrate the elements of the system which store data, the paths of data transfer between these elements, and major control elements of the system. Temporary storage of instruction, auxiliary and data words is provided, during processing and control operations, in the various registers of the system. Transfer of data between registers and other elements of the system, as indicated by the interconnecting lines of FIG. 4, is normally effected by the parallel transfer of binary digits from the source register or element to the receiving register or element.

Memory

Memory 11, illustrated diagrammatically in FIGS. 1 and 4, stores data words which are to be processed, data words which have resulted from prosessing, data words representing process parameters and other process information, instruction words to direct processing and control and auxiliary words for addressing and control. Memory 11 of the computer system is adapted to store up to 32,768 words of 24 bits each plus a parity bit. Of the memory locations provided for storage of information, the following are reserved for special purposes as indicated in the table:

RESERVED MEMORY LOCATIONS

| Memory locations (octal): | Use |
|---|---|
| 00000 | Primary bulk storage memory pointer word. |
| 00001–00007 | Storage of index words for address and microcoded field modification. |
| 00010 | Q-Register (auxiliary arithmetic register). |
| 00011–00017 | Additional bulk storage memory pointer words. |
| 00020 | Memory protect error response location. |
| 00021 | Memory protect, saved I-Register word. |
| 00024 | API Stall Alarm error exit location. |
| 00031–00037 | Peripheral device pointer words. |
| 00040–00077 | Quasi instruction branch vectors or single word quasi. |
| 00100–00177 | Memory protect status words. |
| 00200–00377 | Automatic program interrupt control word storage locations. |

Magnetic Core Storage Unit 13 of Memory 11 utilizes coincident-current storage elements well known in the art. The structure and operation of such storage elements is described, for example, in the publication by C. V. L. Smith, "Electronic Digital Computers," chapter 12, Mc-Graw-Hill Company, Inc., New York, 1959. The location of a word stored in Magnetic Core Storage Unit 13 is identified by the binary number respresenting the address of the particular storage location in the three-dimensional magnetic core matrix where the word is stored. To obtain information from Memory 11, the appropriate address is supplied to Memory Address Register 80, illustrated in FIG. 4. Address decode circuits and sense amplifiers (not shown) cause the transfer of the contents of the addressed memory location from Magnetic Core Storage Unit 13 to Memory Data Register 81, as well known in the art, making the data word available to Arithmetic and Control Unit 10.

The extraction of an information word from a storage location of Magnetic Core Storage Unit 13 may change the magnetic state of the individual cores comprising that memory location, destroying the information stored therein. As well known in the art, automatic apparatus is provided to immediately restore to the storage location the information word transferred to Memory Data Register 81.

In storing an information word in Magnetic Core Storage Unit 13, the information word is transferred through Memory Multiplexer 12 from the Arithmetic and Control Unit 10 into Memory Data Register 81. The address of the storage location into which the information word is to be transferred is placed in Memory Address Register 80. The address decode apparatus and inhibit drivers (not shown) of Memory 11 cause transfer of the information word from Memory Data Register 81 to the magnetic cores of the addressed storage location of Magnetic Core Storage Unit 13, as well known in the art.

Memory Address Register 80, illustrated in FIG. 4, is a 15-bit register forming part of Memory 11 which receives a 15-bit address through Memory Multiplexer 12 specifying the storage location of Magnetic Core Storage Unit 13 from which or to which an information word is to be transferred via Memory Data Register 81. Memory Data Register 81 also forms part of Memory 11 and is a 24-bit register for temporarily storing an information word which is to be stored in Magnetic Core Storage Unit 13 during a memory write operation or which has been received from Magnetic Core Storage Unit 13 during a memory read operation. Information words are transferred from Arithmetic and Control Unit 10 to Memory Data Register 81 through Memory Multiplexer 12 while information words stored in Memory Data Register 81 during a memory read operation are transferred directly to the Arithmetic and Control Unit 10, as illustrated in FIG. 4.

During a memory read operation, Memory 11 provides signal MDRY to Arithmetic and Control Unit 10 when the information word from the addressed memory location is available in Memory Data Register 81. Signal MRLS is provided to Arithmetic and Control Unit 10 by Memory 11 when the memory read or write operation is completed. Signals MDRY and MRLS serve to synchronize operations in Arithmetic and Control Unit 10 with operations in Memory 11.

Arithmetic and Control Unit

Arithmetic and Control Unit 10 exercises operational control over the computer system in response to a plurality of distinct instructions which are supplied thereto from Memory 11 in the sequential order necessary to perform a particular processing or control operation. The information which is processed by Arithmetic and Control Unit 10 is supplied primarily from Memory 11. This information is usually transferred into and out of Memory 11 under control of Arithmetic and Control Unit 10.

Arithmetic and Control Unit 10 comprises registers for temporarily storing data, longic circuits for transferring data through and between registers and flip-flops employed as control signal sources. Arithmetic and Control Unit 10 further includes a timing control unit for controlling the timing of the operations performed by Arithmetic and Control Unit 10 and an operations control unit for directing operations performed by Arithmetic and Control Unit 10. FIG. 4 illustrates diagrammatically the elements of Arithmetic and Control Unit 10 which store data, the paths of data transfer between these elements and certain control elements. Arithmetic and Control Unit 10 comprises the following registers, shown in FIG. 4: B–Register 100, I–Register 101, A–Register 102, P–Register 1033, V–Register 104, L–Register 105 and J–Counter 106. Arithmetic and Control Unit 10 also includes Parallel Adder Unit 110, Timing Control Unit 111, Operations Control Unit 112 and control signals source Filp-Flops 113. Transfer of information between the registers and parallel adder unit of Arithmetic and Control Unit 10 and other elements of the computer system, as indicated by the interconnecting lines of FIG. 4, is normally effected by parallel transfer of binary digits from the source element to the receiving element. The basic characteristics and functions of the registers and other elements are summarized below as a basis for the more detailed discussion of the invention.

B-Register 100 is a 24-bit register comprising Flip-Flops B23–B00. B–Register 100 stores all instruction and data words being transferred to or from Memory 11. During the transfer of an instruction word from Memory 11 to Arithmetic and Control Unit 10, the operation code, index bits and relative addressing bit of the instruction word are transferred in parallel from B–Register 100 to I–Register 101 while the address field of the instruction word is transferred in parallel from B–Register 100 to Parallel Adder Unit 110. The entire contents of B–Register 100 may also be transferred in parallel to Parallel Adder Unit 110. In transferring information from Arithmetic and Control Unit 10 to Memory 11, the information word in B–Register 100 is transferred in parallel to Memory Multiplexer 12. Information is thus transferred in parallel from B–Register 100 to Memory Multiplexer 12, I–Register 101 and Parallel Adder Unit 110.

B–Register 100 is adapted to receive, by parallel transfer, the contents of Memory Data Register 81 and the output of Parallel Adder Unit 110. B-Register 100 may serve as an extension of A–Register 102 when performing a left or right shift. During a left shift, the contents of either Flip-Flop B22 or B23 of B–Register 100, as specified by the instruction word, are transferred to Flip-Flop A00 of A-Register 102. During a right shift, the contents of Flip-Flop A00 of A–Register 102 are transferred to either Flip-Flop B22 or B23 of B-Register 100. as specified by the instruction word. During a multiplication operation, B–Register 100 stores the multiplier and upon completion of the multiplication operation, holds the least significant bits of the product. During a division operation, B-Register 100 holds the least-significant bits of the dividend and, upon completion of the division operation, stores the quotient. The contents of B–Register 100 are shifted left circular during a TIM or TOM input or output operation. During a left circular shift, the binary digit stored in Flip-Flop B23 of B–Register 100 is transferred to Flip-Flop B00 as the contents of B–Register 100 are shifted left circular through one bit position.

I-Register 101 is a 25-bit register for storing the instruction word which is to be executed by Arithmetic and Control Unit 10. I-Register 101 comprises Flip-Flops I23–I00 and IRA. The extra bit position has as its purpose the provision of relative addressing capability. The operation code of the instruction word may have any one of a plurality of bit configurations, each configuration directing a fundamentally different processing or control operation in the computer system. I-Register 101 is adapted to receive, by parallel transfer, the contents of Flip-Flops B23–B14 of B-Register 100, the output of Parallel Adder Unit 110 and the contents of J-Counter 106. The contents of I-Register 101 are applied in parallel to Parallel Adder Unit 110. The information stored in Flip-Flops I14–I09 is applied in parallel to V-Register 104. Similarly, the contents of Flip-Flops I14–I00 are applied in parallel to P-Register 103 while the contents of Flip-Flops I04–I00 are applied to J-Counter 106. During the multiplication operation, I-Register 101 stores the multiplicand and during a division operation stores the divisor.

A-Register 102 is a 24-bit register comprising Flip-Flops A23–A00. A-Register 102 is adapted to receive, by parallel transfer, the output of Parallel Adder Unit 110. The contents of A-Register 102 are also applied in parallel to the inputs of Parallel Adder Unit 110. A-Register 102 stores the augend during an add operation, the minuend during a subtract operation and the sum or difference upon completion of the operation. During a multiplication operation, A-Register 102 stores the partial product and during a divide operation stores the twenty-four most-significant bits of the dividend. Upon completion of a multiplication operation, A-Register 102 stores the twenty-four most-significant bits of the product and upon completion of a divide operation stores the 24-bit remainder. As described in conjunction with B-Register 100, A-Register 102 may be shifted left or right. In addition, A-Register 102 may be shifted with the information being transmitted to Flip-Flop A23 for each bit position shifted, being derived from Flip-Flop A00 or other flip-flop of A-Register 102. During a left shift, the contents of flip-flop A23 are lost.

P-Register 103 is a 15-bit counter comprising Flip-Flops P14–P00. The sequence in which successive instructions are executed is controlled by P-Register 103 which serves as a program counter. The count in P-Register 103 is used to provide the address of instruction words in memory and is advanced in response to execution of an instruction to form the address of the next instruction to be executed. The amount by which the P-Register count is advanced is determined by the type of action required in Arithmetic and Control Unit 10 as follows:

(a) Normal Program Sequence—count in P-Register advanced by 1.
(b) Jump—count in P-Register advanced by 2.
(c) Branch—P-Register is set to quantity specified by the address field of the branch instruction.

P-Register 103 is adapted to receive by parallel transfer information from Flip-Flops I14–I00 of I-Register 101. The contents of P-Register 103 may be transferred in parallel to Memory Multiplexer 12 and to Parallel Adder Unit 110. The contents of Flip-Flops P14–P09 of P-Register 103 are transferred to V-Register 104.

V-Register 104 is a 6-bit register comprising Flip-Flops V05–V00. V-Register 104 is termed the status word address or the volume register and stores the address of one of 64 protect status words utilized in protecting the contents of Magnetic Core Storage Unit 13. V-Register 104 is adapted to receive, by parallel transfer, information from either P-Register 103 or I-Register 101. During addressing of Memory 11, the contents of V-Register 104 are employed to determine whether or not the appropriate protect status word is available to identify the protect status of the addressed memory location.

L-Register 105 is a 16-bit register comprising Flip-Flops L15–L00. L-Register 105 is employed to store the appropriate protect status word which identifies the protect status for eight 64-word blocks of memory locations in Magnetic Core Storage Unit 13. L-Register 105 is adapted to receive, by parallel transfer, the output of selected bits of Parallel Adder Unit 110. J-Counter 106 is a 5-bit binary counter comprising Flip-Flops J04–J00. J-Counter 106 is normally employed to count shifts during shift operations in Arithmetic and Control Unit 10 and is also used during multiply and divide operations. J-Counter 106 is capable of receiving, by parallel transfer, information from I-Register 101. The contents J-Counter 106 may be transferred in parallel to I-Register 101.

The Q-Register of Arithmetic and Control Unit 10 comprise memory location $00010_8$ of Magnetic Core Storage Unit 13 and is an auxiliary register used to assist A-Register 102 in performing arithmetic and logical operations. The Q-Register is used to store the multiplier and the least-significant bits of a product during a multiplication operation. During a division operation, the Q-Register stores the least-significant bits of the dividend and quotient. The Q-Register may be utilized in conjunction with A-Register 102 to form a double-length register which may be shifted left or right. The contents of the Q-Register may be directly affected by certain instructions.

Parallel Adder Unit 110 is a conventional 24-bit parallel adder which performs all arithmetic operations in Arithmetic and Control Unit 10. Parallel Adder Unit 110 is capable of receiving, by parallel transfer, the contents of B-Register 100, I-Register 101, A-Register 102 and P-Register 103. The output of Parallel Adder Unit 110 may be applied to B-Register 100, I-Register 101, A-Register 102 and L-Register 105. Parallel Adder Unit 110 also serves as a buffer during input/output operations involving data transfers with peripheral Input/Output Buffer 16 and Input/Output Expander 18. During input/output operations, Parallel Adder Unit 110 receives inputs from I/O Bus 25 and applies its output to I/O Bus 25.

Timing Control Unit 111 provides timing signals to control the sequence and time of occurrence of events in Arithmetic and Control Unit 10. The details of Timing Control Unit 111 are illustrated in FIGS. 5 and 6. Operations Control Unit 112 is responsive to Timing Control Unit 111, to the operation code of instruction words in I-Register 101 and to initiation of input/output operations by Automatic Program Interrupt Unit 15 and provides the necessary gating and logic signals to cause appropriate operations and information transfers to occur in Arithmetic and Control Unit 10 to execute the instruction or perform the input/output operation. The gating and logic signals and their timing necessary to the invention are described in detail in the section entitled "Table Input to Memory (TIM)/Table Output from Memory (TOM)." Control signal source flip-flops 113 comprise various flip-flops which temporarily store signals employed in the operation of Arithmetic and Control Unit 10.

Peripheral Input/Output Buffer

The Peripheral Input/Output Buffer 16 of the computer system comprises a plurality of channels for providing information transfer paths between Arithmetic and Control Unit 10 and peripheral devices of the computer system. Each channel is connected to one peripheral device and provides data transfer in one direction between Arithmetic and Control Unit 10 and the peripheral device. Peripheral Input/Output Buffer 16 also includes control logic circuitry for directing the operation of Peripheral Input/Output Buffer 16 and the transfer of information through the channels of Buffer 16 between peripheral devices and Arithmetic and Control Unit 10, as known in the art. The control logic circuitry receives signals from Arithmetic and Control Unit 10 identifying the operation to be performed in Peripheral Input/Output Buffer 16 and the channel in which the data transfer is to occur. When a peripheral device connected to Peripheral Input/Output Buffer 16 requires information from Arithmetic and Control Unit 10 or is ready to transfer information to Arithmetic and Control Unit 10, the control logic circuitry of Peripheral Input/Output Buffer 16, provides an appropriate program interrupt request signal to Automatic Program Interrupt Unit 15 identifying the channel which requires the program interrupt. Peripheral Input/Output Buffer 16 thus serves to control information transfers between Arithmetic and Control Unit 10 and the connected peripheral subsystems and initiates interruption of the main program in the computer system when a data transfer is required by a connected peripheral device.

Input/Output Expander

Input/Output Expander 18 of the computer system comprises a plurality of channels for providing test information, control information and data transfer paths between Arithmetic and Control Unit 10 and Peripheral Input/Output Buffer 16 and between Arithmetic and Control Unit 10 and the elements of the system associated with the controlled and/or monitored process. Input/Output Expander 18 also includes logic circuitry for directing information transfers through Expander 18 in an orderly manner. The communication of data and test and control information from Arithmetic and Control Unit 10 to the process is effected by Gen II instructions. Similarly, the transfer of information from the process to Arithmetic and Control 10 occurs through execution of Gen II instructions by the system. The channel of Input/Output Expander 18 employed in an information transfer is selected by channel identification signals transmitted to Input/Output Expander 18. Timing within Input/Output Expander 18 is provided by NPHA and NPHB signals generated in Arithmetic and Control Unit 10.

Timing Control Unit

Movement of information between the registers of Arithmetic and Control Unit 10 and other operations are performed in relative synchronism under control of a common timing or clock generator. This clock generator may conveniently be a stable oscillator coupled with a suitable wave-shaping circuit to produce a train of uniformly spaced rectangular pulses designated clock pulses. FIG. 5 is a block diagram representing the clock generator 120 and illustrates the wave form of the basic clock signal TCK1 employed in the computer system. As shown in FIG. 5, the basic clock signal of the computer system comprises a series of pulses spaced from each other in time by a period of 100 nanoseconds, the clock rate being 10 megacycles. The individual pulses of the pulse train have an approximate width of 25 nanoseconds.

To control and maintain an orderly and efficient succession of operations within Arithmetic and Control Unit 10, Sequence Control Logic 121, as illustrated in FIG. 6, is provided. Sequence Control Logic 121 comprises five sequence control flip-flops designated SC1, SC2, SC3, SC4 nad SC5 to define five mutually exclusive sequence control states. The sequence control states designated by flip-flop SC1 is identified by output signal SC01 of Sequence Control Logic 121. Similarly, the sequence control states designated by flip-flops SC2, SC3, SC4 and SC5 are identified by output signals SC02, SC03, SC04 and SC05 respectively of Sequence Control Logic 121. Sequence Control Logic 121 receives clock signals TCK1 from Clock Generator 120 and is responsive to output signals from Sequence Time Counter 122 and Delay Time Counter 123 in defining the timing of the sequence control states.

During Sequence Control State 1, the instruction word stored in the memory location of Magnetic Core Storage Unit 13 identified by the program count in P-Register 103 is transferred from Memory Data Register 81 through B-Register 100 to I-Register 101 of Arithmetic and Control Unit 10. In addition, the program count in P-Register 103 may be incremented if instruction execution is completed in Sequence Control State 1, and other information movement between other registers may occur. A few instructions which can be completed by a simple group of operations are completely executed during Sequence Control State 1. Relative addressing, when specified by the relative addressing bit 14 of full operand and quasi-instructions, is performed during Sequence Control State 1.

Sequence Control State 2, when required, is entered immediately following Sequence Control State 1. During Sequence Control State 2, any index modification of the instruction word operand address field required by the index bits of the instruction word is performed. Certain full operand instructions also utilize Sequence Control State 2 to partially execute the instruction.

Sequence Control State 3 is normally entered following Sequence Control States 1 or 2 during execution of certain instructions and during performance of a TIM or a TOM operation.

Sequence Control State 4 is normally entered following Sequence Control State 4 is entered during execution of most insrtuction words and during performance of a TIM or a TOM operation Sequence Control State 4 may be exTOM operation. Sequence Control State 4 may be extended in time as required for certain commands and operations.

Sequence Control State 5 is entered after Sequence Control State 4 for certain instructions and is utilized for performing additional functions required by certain instructions and operations. Execution of these instructions and performance of a TIM or TOM operation is completed during Sequence Control State 5.

The timing control signals required to control the sequence of events within each sequence control state and for providing timely changes from one sequence control state to another are generated primarily by Sequence Time Counter 122 comprising flip-flops SCA, SCB and SCC. Sequence Time Counter 122 receives clock signals TCK1 from Clock Generator 120 and is responsive to output signals of Sequence Control Logic 121 and also provides signals to Sequence Control Logic 121. The states of flip-flops SCA, SCB and SCC define specific time intervals in which various operations are performed. The relationship between the states of flip-flops SCA, SCB and SCC and the six different time intervals specified by Sequence Time Counter 122 are illustrated in the following table:

| SCA | SCB | SCC | Time (output signal) |
| --- | --- | --- | --- |
| 0 | 0 | 0 | Time 0 envelope (TT0E). |
| 0 | 0 | 1 | Time 1 envelope. |
| 0 | 1 | 1 | Time 2 envelope. |
| 1 | 1 | 1 | Time 3 envelope. |
| 1 | 1 | 0 | Time 4 envelope. |
| 1 | 0 | 0 | Time 5 envelope (TT5E). |
| 1 | 0 | 1 | Time 6 envelope (TT6E). |

The Time 0, Time 1, Time 2, Time 3, Time 4 and Time 5 envelopes are common to each sequence control state. The Time 6 envelope is entered only during execution of certain instructions, namely the Gen I, Gen II, Gen III, multiply and divide instructions, and during performance of TIM or TOM operations.

Delay Time Counter 123 comprises flip-flops AFF, BFF, CFF, DFF and EFF and is employed to provide timing within the Time 6 envelope when the Time 6 envelope is entered during execution of certain instructions and operations. Delay Time Counter 123 thus provides timing during extension of the normal duration of Sequence Control State 4. During sequence control states in which Time 6 envelope is not entered, Delay Time Counter 123 is reset to $30_8$ and is inhibited from being incremented. During Time 6 envelope, Delay Time Counter 123 may be preset at $30_8$ in response to signal TPAF and subsequently changed to a count of $4_8$ by signal TPO4 in order to provide time intervals of appropriate length within Time 6 envelope. Output Signal TD30 of Delay Time Counter 123 issues during Time 6 envelope when the count of Delay Time Counter 123 reaches $30_8$. Delay Time Counter 123 receives clock signals TCK1 from Clock Generator 120 and also receives signals from Sequence Control Logic 121 and Frequency Divider 125.

Extended Time Counter 124 cooperates with Delay Time Counter 123 to designate timing intervals during Time 6 envelope. The first of such time intervals is identified as the period during which flip-flop EC1 is set to the 1-state and flip-flop EC2 is reset to the 0-state. The second of such time intervals is identified as the period during which flip-flop EC1 is reset to the 0-state and flip-flop EC2 is set to the 1-state. The change in states of flip-flops EC1 and EC2 of Extended Time Counter 124 are controlled by Delay Time Counter 123 and occur when the count in Delay Time Counter 123 reaches $30_8$ during Time 6 envelope.

Frequency Divider 125 comprises flip-flops FD1 and FD2 and serves to adjust the counting rate of Delay Time Counter 123 in accordance with the rate at which information bits are being transmitted between Arithmetic and Control Unit 10 and a peripheral device. If a peripheral device has a high data transfer rate and is connected to a high speed channel of Peripheral Input/Output Buffer 16, Delay Time Counter 123 is responsive to each clock pulse TCK1 provided by Clock Generator 120, with the result that Delay Time Counter 123 counts 20 clock pulses advancing from a count of $4_8$ to a count of $30_8$ in 2 microseconds. If the peripheral device being communicated with has a low data transfer rate and is connected to a low speed channel, Frequency Divider 125 causes Delay Time Counter 123 to count every fourth clock pulse provided by Clock Generator 120, with the result that Delay Time Counter 123 advances from a count of 4₈ to a count of 30₈ in response to 80 clock pulses provided by Clock Generator 120 to define a time period of 8 microseconds.

LOGICAL SCHEMATIC DIAGRAMS

In the illustrated computer system, two or more output signals from flip-flops and timing pulse signal sources are combined logically by AND-gates and OR-gates to provide input signals to other flip-flops or to other gates, as known in the art. Thus, the two trigger input signals to a flip-flop are the output signals of respective logical chains of AND-gates and OR-gates which, in turn, receive output signals provided by other flip-flops or by timing pulse signal sources. These logical chains may be described and illustrated by logical expressions which are actually logical schematic diagrams representing the logical and structural interconnection of a logical chain. Thus, the circuits providing the trigger input signals to a flip-flop may be illustrated by a set of logical schematic diagrams for each flip-flop. These logical schematic diagrams are termed "flip-flop input" diagrams. Flip-flop input diagrams are employed in FIGS. 16, 17, 20, 21 and 32 to illustrate the logical circuits providing input signals to certain flip-flops employed in the system.

In addition to flip-flop input diagrams, another type of logical schematic diagram, termed a "logical combination signal" diagram is employed. Certain signals generated within logical chains are identified by signal designations. Such signals are the output signals of a first logical chain and are employed as input signals to one or more additional logical chains. The logical combination signal diagram is a representation of such a first type logical chain. Logical combination signal diagrams are employed in FIGS. 13–15, 17–20, 22–31 and 33 to illustrate the logical structure of the system.

In the logical circuits represented by the flip-flop input and the logical combination signal diagrams, the logical functions of conjunction are implemented by AND-gates and the logical functions of inclusive-OR are implemented by OR-gates, as known in the art. Thus use of logical schematic diagrams to provide simple, compact and readily analyzed representations of component structures and to identify signal relationships, circuit elements and circuit relationships is described in detail in U.S. Pat. 3,077,984 issued to Robert R. Johnson and assigned to the assignee of the present invention.

INSTRUCTIONS

The computer system of FIG. 1 executes the instruction codes of a succession of instruction words to accomplish processing and control. The instruction repertoire of the system includes full operand, quasi, Gen I, Gen II and Gen III instructions, as described below. The signal designated within the parentheses for each type of instruction issues when the corresponding instruction word is in I-Register 101.

Full operand instructions

Full operand instructions are used in the computer system to perform arithmetic operations, logical operations, index control operations and data transfers to and from memory. The operation code of a full operand instruction word identifies the operation to be performed while the operand address designates the address of a storage location in memory from which a word is to be read or into which a word is to be stored during execution of the instruction. In the description of the operations performed under the control of full operand instruction words, location Z is the memory location corresponding to the address contained in the operand address field or, if modified, the final address determined after index or relative address modification.

ADD Z to A (DADD)—This instruction sums the contents of memory storage location Z with the contents of A-Register 102 and stores the result in A-Register 102.

Logical AND to A (DANA)—This instruction performs the logical operation of conjunction on the contents of memory storage location Z and the contents of A-Register 102. The corresponding bits of Z and A are compared and, if both are binary 1, a binary 1 is placed in that position of A-Register 102. If either or both of the compared bits are binary 0's, a binary 0 is placed in that storage position of A-Register 102.

Branch Unconditionally (DBRU)—This instruction unconditionally transfers program control to memory storage location Z by transferring this address to P-Register 103.

Branch If Test Flip-Flop Reset (DBTR)—This instruction transfers program control to memory storage location Z if the test flip-flop is reset. If the test flip-flop is set, the program sequence is not altered. The status of the test flip-flop is not changed by this instruction.

Branch If Test Flip-Flop Set (DBTS)—This instruction transfers program control to memory storage location Z if the test flip-flop is set. If the test flip-flop is not set, the normal program sequence is not altered. The status of the test flip-flop is not changed by this instruction.

Decrement Memory and Test (DDMT)—This instruction subtracts 1 from the contents of memory storage location Z each time it is executed. If this instruction is not the result of an automatic program interrupt and the original contents of memory location Z were not equal to zero, the test flip-flop is set; the test flip-flop is reset if the original contents of memory storage location Z were equal to zero. If this command is the result of an automatic program interrupt and if the original contents of memory location Z were equal to zero, a signal is supplied to the automatic program interrupt unit. The test flip-flop is not affected if this instruction results from an automatic program interrupt.

Divide (DDVD)—This instruction divides the 47-bit dividend comprising 24 bits of A-Register 102 and 23 bits of the Q-Register by the divisor contained in memory storage location Z. The quotient is placed in the Q-Register and the remainder is placed in A-Register 102. The magnitude of the divisor must be greater than the magnitude of the contents of A-Register 102. If not, the overflow flip-flop is set. The sign of the contents of A-Register 102 applies to the remainder and the sign of the contents of the Q-Register applies to the quotient.

Exclusive OR to A-Register (DERA)—This instruction compares the bits stored in A-Register 102 with the corresponding bits in memory storage location Z. If the bits in the corresponding positions are alike, a binary 0 is placed in those positions of A-Register 102. If the bits in the corresponding positions are not identical, a binary 1 is placed in those positions of A-Register 102.

Increment X (DINX)—This instruction adds the numeric value of the instruction operand to the contents of the storage location specified by the index bits of the instruction word. The result is stored in the memory storage location specified by the index bits.

Load A-Register (DLDA)—This instruction places the contents of memory storage location Z in A-Register 102. The contents of memory storage location Z are unchanged.

Load Place (DLDP)—This instruction transfers program control to the location specified in bit positions 14–0 of memory storage location Z. The contents of bit position 21 of storage location Z controls the status of the permit automatic interrupt flip-flop, setting the flip-flop if bit 21 is a binary 1 or resetting the flip-flop if bit 21 is a binary 0. This command clears the quasi flip-flop if the trapping mode flip-flop is set.

Load Q-Register (DLDQ)—This instruction places the contents of memory storage location Z into the Q-Register (memory storage location $00010_8$); the contents of memory storage location Z are unchanged by this instruction.

Load X From X (DLDX)—This instruction places the contents of memory storage location Z into the memory location specified by the index bits of the instruction word.

Load Place and Restore (DLPR)—This instruction restores the status of the overflow flip-flop, the permit automatic interrupt flip-flop and the test flip-flop from the contents of bit positions 22, 21 and 20 respectively of memory storage location Z. The contents of bit position 14–0 of memory storage location Z are placed in P-Register 103 to transfer program control. If bit 19 of the contents of location Z is a binary 1, the trapping mode flip-flop TRM is set. If bit 19 is a binary 0, the state of the trapping mode fiip-flop is unchanged. This command resets the quasi flip-flop if the trapping mode flip-flop is set.

Load X With Count (DLXC)—If bits 14–0 of this command are binary 0's, the contents of J-Counter 106 are stored in bit positions 4–0 of the memory storage location specified by the index bits of the instruction word. Binary 0's are stored in bit positions 23–5 of that storage loaction. If bits 14–0 of the command are not binary 0's the following occurs:

(1) Bit positions 23–14 of the location specified by the instruction index bits are cleared.

(2) Bits 13–5 of the memory location specified by the index bits are replaced by bits 13–5 of the instruction word. If this instruction is relatively addressed (bit 14 is a binary 1) bits 15–5 are replaced by the sum of bits 14–5 of the instruction word plus the address of the instruction word.

(3) Bits 4–0 of the memory location specified by the index bits are replaced by the logical OR of the contents of J-Counter 106 and five least-significant bits of I-Register 101.

Load X With K (DLXK)—This instruction stores its operand field Z in the memory location specified by the index bits of the instruction word. The remaining bits of the specified location are set to binary 0.

Multiply (DMPY)—This instruction forms the product of the contents of memory storage location Z (multiplier) and the contents of the Q-Register in memory location $00010_8$ (multiplicand). The result is stored in A-Register 102 and in positions 22–0 of the Q-Register with the most-significant half in A-Register 102. Bit 23 of the Q-Register is set to binary 0 and is not a part of the product. The sign of the contents of A-Register 102 applies to the entire product.

No Operation (DNOP)—This instruction transfers program control to the next instruction in the program sequence. No operation is performed.

Logical OR to A (DORA)—This instruction performs the logical OR of the contents of memory storage location Z with the contents of A-Register 102. Each bit of storage location Z is compared with the corresponding bit of A-Register 102. When either or both bits are a binary 1, a binary 1 is placed in that position of A-Register 102. When both bits are binary 0, that position of A-Register 102 is not changed.

Save Place and Branch (DSPB)—This instruction places the status of the overflow, permit automatic interrupt, test, trapping mode and watchdog status flip-flops in bit positions 22–18 respectively of memory location $00001_8$. The contents of P-Register 103, plus one if a system protection violation has not occurred, are stored in bit positions 14–0 of memory location $00001_8$. If a system protection violation has occurred, the contents of P-Register 103 are stored. This instruction resets the permit automatic interrupt flip-flop. The trapping mode flip-flop is reset if this instruction is executed due to a system protection violation or if this instruction is executed as the result of an automatic program interrupt.

Store Contents of A (DSTA)—This instruction places the contents of A-Register 102 into memory storage location Z. The contents of A-Register 102 are unchanged.

Store Contents of Q (DSTQ)—This instruction places the contents of the Q-Register into memory storage location Z. The contents of the Q-Register are unchanged by this instruction.

Store X Location Into Z (DSTX)—This instruction stores the contents of the memory location specified by the index bits of the instruction word into memory storage location Z.

Subtract Z From A (DSUB)—This instruction performs algebraic subtraction of the contents of memory storage location Z from the contents of A-Register 102. The result of the subtraction is placed in A-Register 102. If the result is too large to be stored in A-Register 102, the overflow flip-flop is set.

Test X High Or Equal (DTXH)—This instruction sets the test flip-flop if the contents of the memory location specified by the instruction word index bits are greater than or equal to the value K in the operand address field of the instruction word. If the contents of the specified storage location are less than K, the test flip-flop is cleared.

Execute (DXEC)—This instruction indicates the address Z of the next instruction to be executed. P-Register 103 is not incremented and the program continues in sequence after executing the instruction located at address Z. The instruction located in address Z is called the object instruction of XEC.

Quasi-Instructions (XQUA)

Quasi-instructions supply the programmer with a mnemonic which perimts the running program to be linked to a subroutine. The execution of the comamnd is accomplished by means of the subroutine to which the particular quasi-instruction is linked. The operand portion of the quasi-instrutcion is stored in memory location $00002_8$ and the next instruction (normally a save place and branch instruction) is fetched from the memory storage location specified by the operation code of the quasi-instruction. The DSPB instruction branches to the software subroutine associated with the quasi-instruction. The operand portion of the quasi-instruction stored in memory location $00002_8$ identifies a memory location utilized by the subroutine in executing the quasi-instruction. If the system is in the trapping mode, the quasi flip-flop always sets in response to a quasi-instruction. If the object instruction is a DSPB instruction, the quasi flip-flop remains set until execution of the quasi subroutine is completed. If the object instruction is not DSPD, the quasi subroutine comprises the single instruction and the quasi flip-flop is immediately reset.

Gen I Instructions (DGN1)

Gen I instructions are microcoded instructions which are used primarily for bit manipulation of the contents of A-Register 102. By controlling the operation of a serial full adder associated with A-Register 102, individual bits of A-Register 102 may be changed, shifted in position, complemented, masked by 1's or 0's, tested for polarity, or counted for the number of 1's and 0's contained therein. The Gen I instruction may also be microcoded to effect J-Counter 106 and the test flip-flop.

Gen II Instructions (DGN2)

Gen II instructions are microcoded instructions which are employed primarily to control input/output operations, i.e. transfers of information between memory 11 and various peripheral devices. One microcoded version of a Gen II instruction, designated DSTM, is employed to generate signal MSTM to set trapping mode flip-flop TRM.

Gen III Instructions (DGN3)

Gen III instructions are microcoded instructions which are used to manipulate the contents of A-Register 102, the Q-Register, J-Counter 106 and the overflow flip-flop.

SYSTEM PROTECTION APPARATUS

Magnetic core storage unit 13 of memory 11 comprises 32,768 storage locations for storing information. In accordance with the protection arrangement of the invention, magnetic core storage unit 13 is divided into sixty-four volumes with each volume comprising five hundred twelve storage locations. The five hundred twelve storage locations of each volume are, in turn, divided into eight blocks, each comprising sixty-four storage locations. Thus, magnetic core storage unit 13 comprises five hundred twelve blocks, grouped into sixty-four volumes of eight blocks each, with each block comprising sixty-four storage locations.

Figure 7:
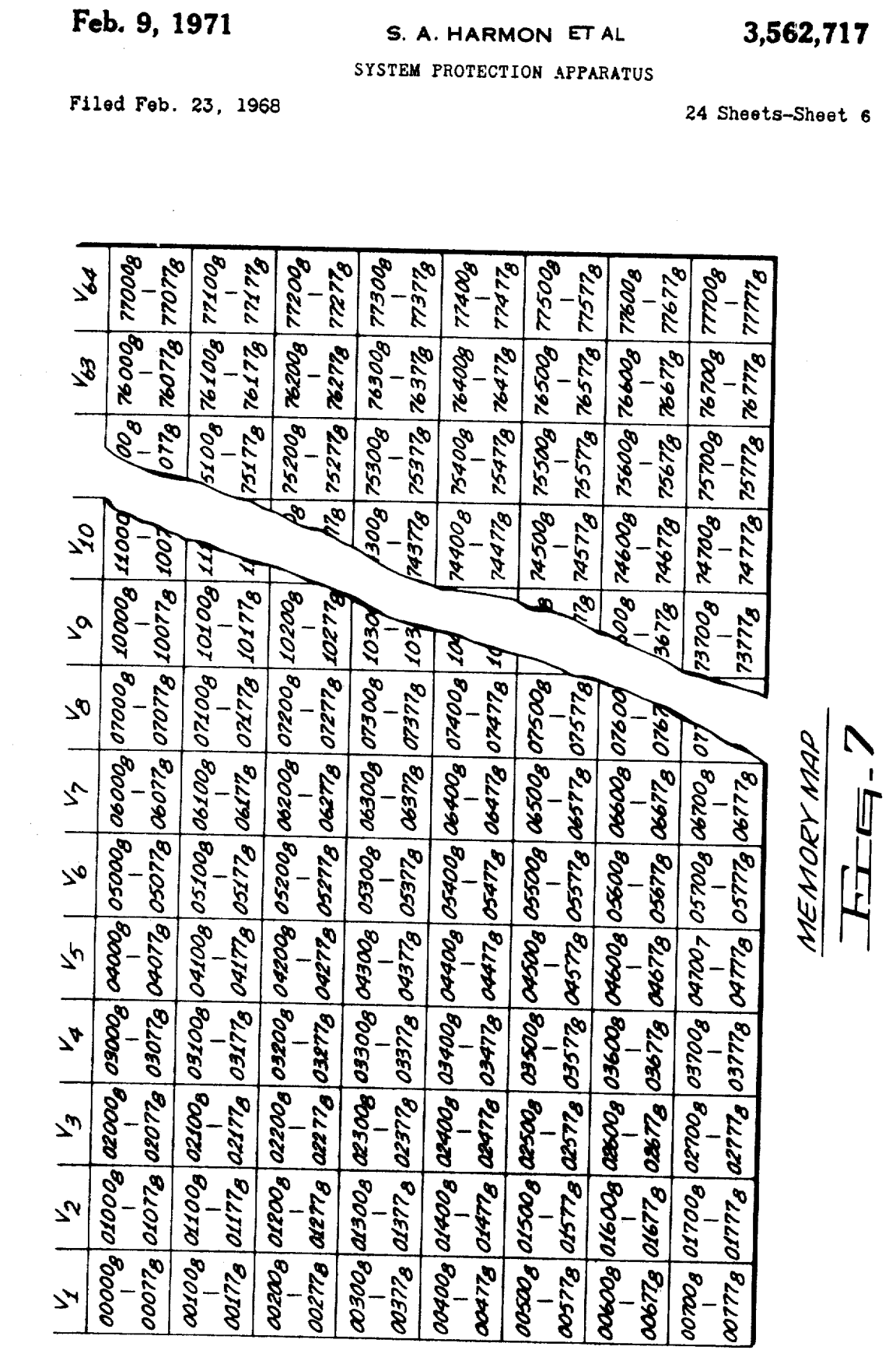

FIG. 7 is a diagram or map of magnetic core storage unit 13 illustrating diagrammatically the division of the 32,768 words of memory into five hundred twelve blocks of sixty-four storage locations each. In FIG. 7, the storage location addresses are expressed in octal notation; for example the storage location identified by binary address 00000000000000 is expressed octally as $00000_8$ and the binary address 111111111111111 is expressed octally as $77777_8$. Volume one, designated $V_1$, consists of the first five hundred twelve storage locations of memory, divided into eight blocks of sixty-four storage locations each, as illustrated. Volumes two through sixty-four, designated $V_2$–$V_{64}$, comprise successive five hundred twelve word groups of memory storage locations, as shown in FIG. 7.

Figures 8, 9:
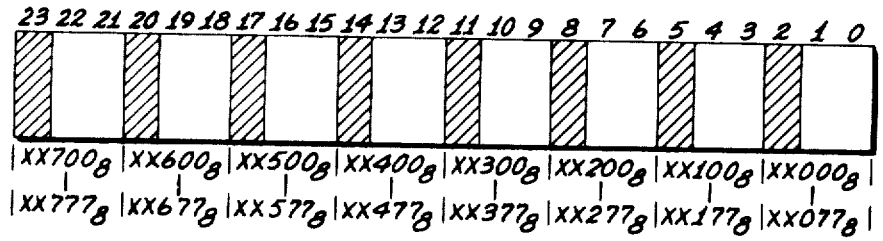
FIG. 8 illustrates diagrammatically the memory storage location containing the protection status word associated with each memory volume.
FIG. 9 illustrates the organization of a system protection status word.

A 24-bit system protection status word is provided for each of the sixty-four volumes in the 32,768 word memory. As shown in FIG. 8, the system protection status word for volume $V_1$ is stored in memory location $00100_8$ and the system protection status words for volumes $V_2$–$V_{64}$ are stored in memory storage locations $00101_8$ through $00177_8$ respectively.

Each 24-bit system protection status word identifies the system protection status of the eight consecutive 64-word memory blocks of the corresponding volume. Referring to FIG. 9 which illustrates the organization of a system protection status word, bit positions 0 and 1 of the status word define the protection status of the first 64-word block of the corresponding volume. In FIG. 9, the letters XX represent any of the octal digit combinations 00–07, 10–17, 20–27, 30–37, 40–47, 50–57, 60–67 and 70–77 corresponding to the sixty-four volumes. For example, bits 0 and 1 of the system protection status word for Volume $V_{63}$ define the protection status of memory storage locations $76000_8$ through $76077_8$. Bit position 2 of the status word is not used. Bit positions 3 and 4 of the status word define the protection status of the second 64-word block of the corresponding volume. Bit position 5 of the status word is not used. Similarly, bit positions 6 and 7, 9 and 10, 12 and 13, 15 and 16, 18 and 19, and 21 and 22 define the protection status of the third, fourth, fifth, sixth, seventh and eighth 64-word blocks of the corresponding volume. Bit positions 2, 5, 8, 11, 14, 17, 20 and 23 are reserved for expansion of the system protection arrangement. Alternatively, a 16-bit system protection status word may be employed.

Protection Status Codes

Four protection codes are provided in the system protection arrangement of the invention for defining the protection status of each block of sixty-four memory storage locations. The four protection codes are as follows:

Protection Status
Code:                                             Significance 11_____ This code indicates that the running program may make unrestricted use of the storage locations of the corresponding 64-word block. The running program may read the contents of the storage locations of the block, write information into the storage locations of the block and may fetch instructions from the storage locations of the block.

01_____ This code indicates that the running program may only read information from the storage locations of the corresponding block or fetch instructions from the block. Write or store operations are not permitted in the block, except by a relative addressed instruction within a quasi-subroutine. In addition, storage of information is always permitted in storage locations $00000_8$–$00017_8$ which are used to store index words and Q-Register data.

10_____ This code indicates that either data read or write operations may be executed in the corresponding block but an instruction may not be fetched from the block, unless it is the object instruction of an XEC command, an instruction of a quasi-subroutine or addressed by an automatic program interrupt. Generally, this code thus identifies a block which may be used for any purpose but storage of instructions.

00_____ This code indicates that the associated 64-word memory block is inaccessible to the running program except that (1) fetching of an instruction within a quasi-subroutine is permitted, (2) housekeeping instructions within a quasi-subroutine may access this area, (3) fetching the object instruction of an XEC command is permitted, (4) addressing memory locations $00000_8$–$00017_8$ is permitted, and (5) fetching or execution of any instruction addressed by an automatic program interrupt is permitted.

System Protection Logic

Figure 10:
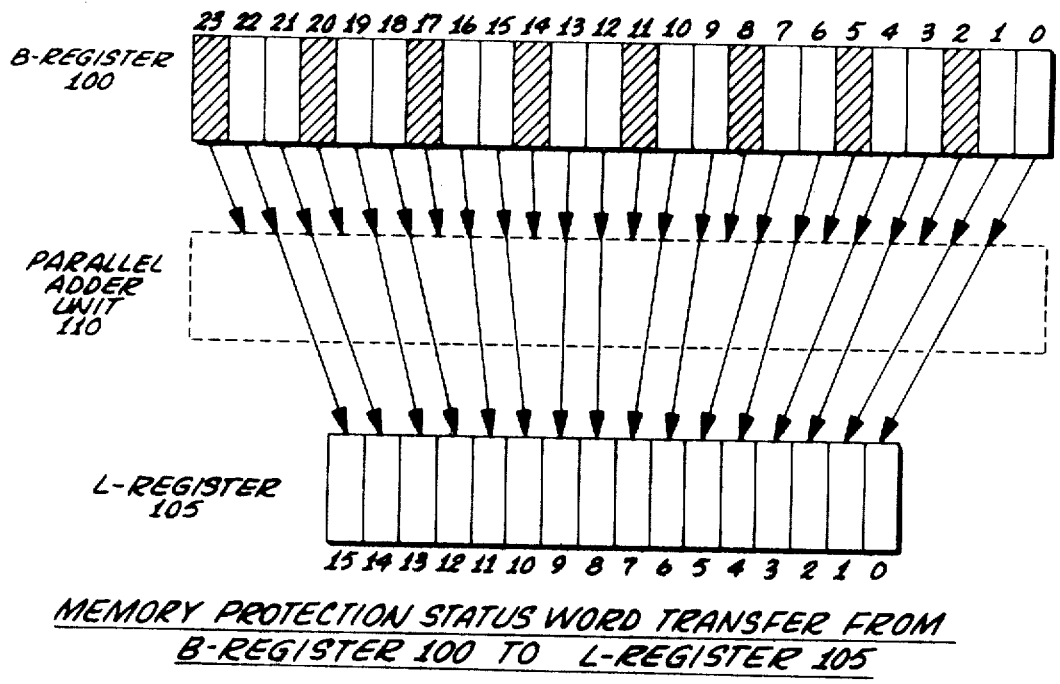
FIG. 10 is a block diagram illustrating the transfer of a system protection status word to the arithmetic and control unit.

L-register 105 is provided in the arithmetic and control unit to provide temporary storage for system protection status words when the system is operating in the protection or trapping mode. Referring to FIG. 10, a system protection status word obtained from memory through memory data register 81 is temporarily stored in B-Register 100. The status word in B-Register 100 is applied to parallel adder unit 110 which masks the unused bits of the 24-bit status word and transfers the sixteen system protection status bits to L-Register 105, as illustrated. Thus, flip-flops L00 and L01 corresponding to bit positions 0 and 1 of L-Register 105 store the status bits for the first 64-word block of the corresponding volume while the L-Register flip-flops corresponding to bit positions 2 and 3, 4 and 5, 6 and 7, 8 and 9, 10 and 11, 12 and 13, 14 and 15 of the L-Register 105 store the status bits for second, third, fourth, fifth, sixth, seventh and eighth 64-word blocks respectively of the corresponding volume.

V-Register 104 stores the most-significant six bits of the address of the system protection status word stored in L-Register 105. The contents of V-Register 104 thus identify the volume corresponding to the status word presently stored in L-Register 105. The six bits stored in V-Register 104 also constitute the least-significant six bits of the address of the memory storage location containing the status word stored in L-Register 105. So long as memory locations within the volume identified by the contents of V-Register 104 are addressed, the system protection status word in L-Register 105 is applicable and defines the protection status of the addressed memory storage location.

Figure 11:
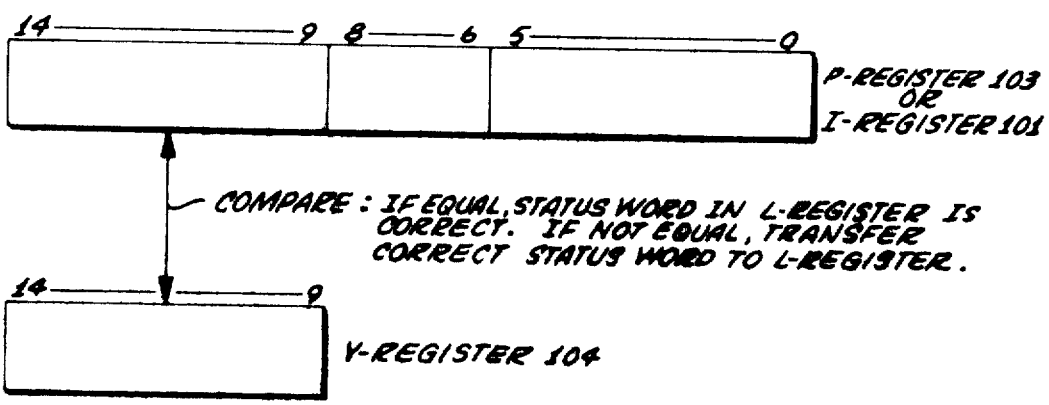
FIG. 11 is a block diagram illustrating the comparison operation for determining if the correct memory protection status word is available in the arithmetic and control of the system of FIG. 1.

Each time memory is addressed from P-Register 103 or I-Register 101 when the system is in the protection or trapping mode, the most-significant six bits of the memory address are compared with the contents of V-Register 104, as illustrated in FIG. 11. If these bits differ, a "volume difference" exists, indicating that the system protection status word in L-Register 105 is not applicable and does not define the protection status of the addressed memory location. The contents of V-Register 104 are then adjusted to correspond to the most-significant six bits of the addressed memory location and the new contents of V-Register 104 are employed to obtain the applicable system protection status word from memory for storage in L-Register 105. If the comparison reveals that the contents of V-Register 104 are identical to the most-significant six bits of the addressed memory location, the status word in L-Register 105 is applicable and the contents of V-Register 104 and L-Register 105 are not altered.

The most-significant six bits of the address in either P-Register 103 or I-Register 101, i.e. bit positions 9–14 inclusive, thus define one of the sixty-four volumes of magnetic core storage unit 13. These bits, in conjunction with assumed bits $00100_8$, form the address of the memory storage location containing the system protection status word corresponding to that volume. Thus, if the contents of bit positions 9–14 inclusive of the address in P-Register 103 or I-Register 101 are $00_8$, the memory storage location containing the status word corresponding to that volume, viz. volume $V_1$, is $00100_8$. Similarly, if the contents of bit position 9–14 inclusive are $07_8$, the address of the memory storage location containing the status word for volume $V_8$ identified thereby is $00107_8$.

Bit positions 6–8 inclusive of the address in P-Register 103 or I-Register 101 identify one of the eight 64-word memory blocks within the volume defined by the contents of bit positions 9–14 inclusive. Thus, as illustrated in FIG. 9, if the contents of bit positions 6–8 inclusive of the memory address are $0_8$, the addressed storage location is in the first 64-word memory block of the volume and flip-flops L00 and L01 of L-Register 105 contain the status bits corresponding to that 64-word memory block. Similarly, if the contents of bit positions 6–8 inclusive of the memory address are $6_8$, the addressed memory location is in the seventh 64-word memory block of the volume and flip-flops L12 and L13 of L-Register 105 contain the status code applicable to that 64-word memory block.

Bit positions 0–5 inclusive of the memory address in P-Register 103 or I-Register 101 identify the particular storage location which is being addressed within the memory block and volume identified by the contents of bit positions 6–14 inclusive.

Figure 12:
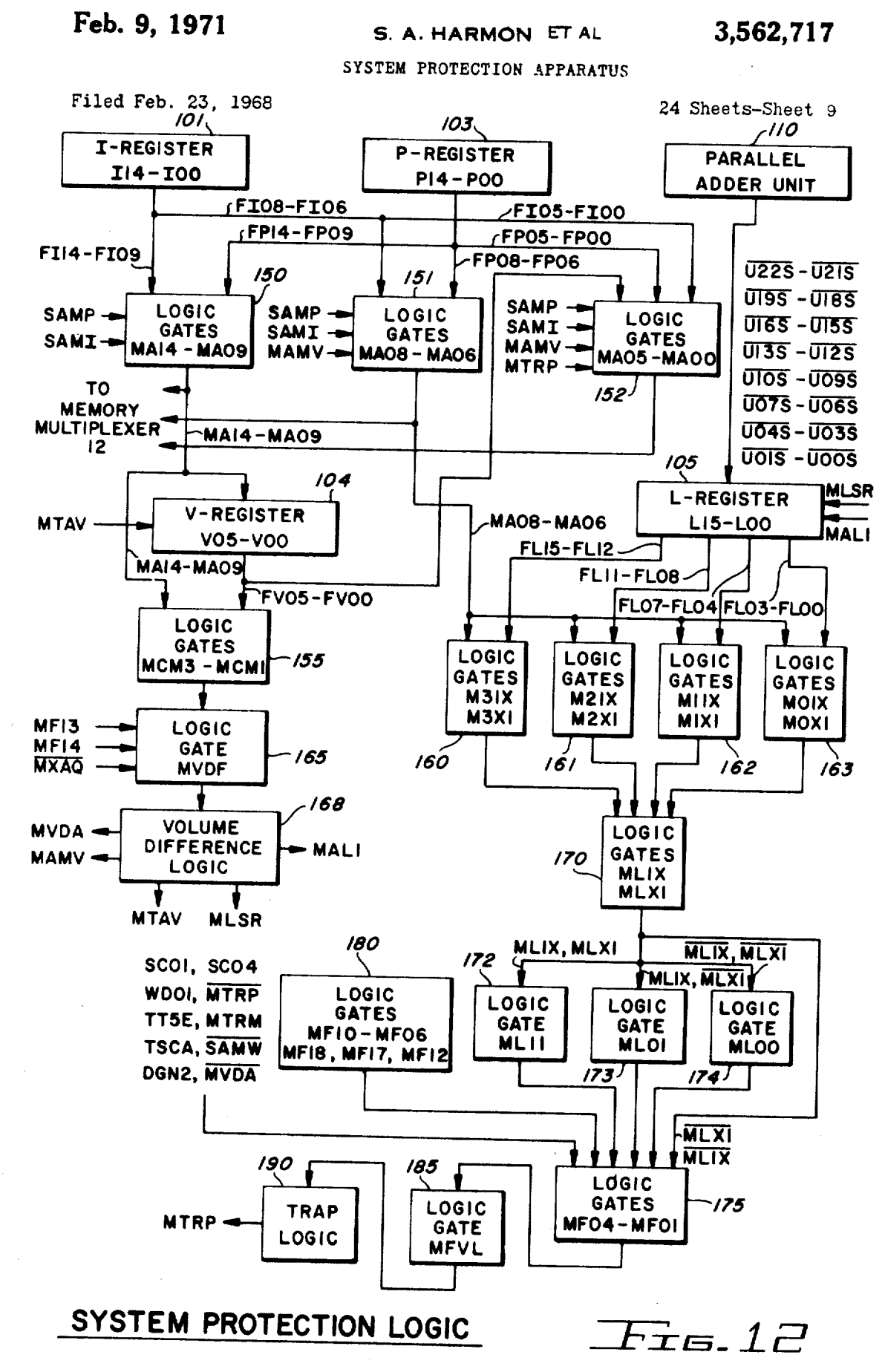

FIG. 12 illustrates the system protection apparatus of the inventions. Referring to FIG. 12, if memory is being addressed from I-Register 101, gating signal SAMI issues to gate the contents of I-Register bit positions 14–9 inclusive, represented by output signals FI14–FI09 of the corresponding I-Register flip-flops, to the output terminals of logic gates MA14–MA09 identified by reference numeral 150. Gating signal SAMI similarly gates the contents of I-Register bit positions 8–6 inclusive, represented by output signals FI08–FI06 of the corresponding I-Register flip-flops, and the contents of I-Register bit positions 5–0 inclusive, represented by output signals FI05–FI00 of the corresponding I-Register flip-flops, to the output terminals of logic gates MA06–MA08, identified by reference numeral 151, and logic gates MA05–MA00, identified by reference numeral 152, respectively. If memory is being addressed from P-Register 103, gating signal SAMP similarly issues to gate the contents of bit positions 14–9 inclusive, represented by output signals FP14–FP09 of the corresponding P-Register flip-flops to the output terminals of logic gates 150. Gating signal SAMP also gates the contents of P-Register bit positions 8–6, represented by output signals FP08–FP06 of the corresponding P-Register flip-flops, and the contents of bit positions 5–0, represented by output signals FP05–FP00 of the corresponding P-Register flip-flops, to the output terminals of logic gates 151 and 152 respectively. Regardless of which register memory is being addressed from, the output signals of logic gates 150 identify the memory volume containing the addressed storage location while the output signals of the logic gates 151 identify the memory block within the identified memory volume which contains the addressed storage location. Output signals of logic gates 152 identify the particular memory storage location within the identified memory block. The logic schematic diagrams illustrating the logical structure of logic gates 150, 151 and 152 are provided in FIGS. 13, 14 and 15 respectively.

The memory address represented by output signals MA14–MA00 of logic gates 150, 151 and 152 is transferred to memory through memory multiplexer 12. Output signals MA14–MA09 of logic gates 150 are also applied to V-Register 104 and to logic gates MCM3–MCM1 identified by reference numeral 155.

Output signals MA08–MA06 of logic gates 151 are applied to logic gates M31X–M3X1 identified by reference numeral 160, logic gates M21X–M2X1 identified by reference numeral 161, logic gates M11X–M1X1 identified by reference numeral 162 and to logic gates M01X–M0X1 identified by reference numeral 163.

The six most-significant bits of the memory address, as represented by output signals MA14–MA09 of logic gates 150, are stored in V-Register 104 in response to the issuance of gating signal MTAV. The flip-flop input diagrams representing the logical chains providing the two trigger input signals to V-Register 104 are provided in FIG. 16. Gating signal MTAV is generated by volume difference logic 168. Output signals FV05–FV00 of the V-Register flip-flops are applied to logic gates 155.

Logic gates 155 receive output signals MA14–MA09 of logic gates 150 and the output signals of the flip-flops of V-Register 104. Logic gates 155 compare the current contents of V-Register 104, which identify the memory volume to which the memory protection status word in L-Register 105 is applicable, with the six most-significant bits of the current memory address, as represented by the output signals of logic gates 150, to determine their equality or inequality. Upon detecting an inequality, indicating that the status word in L-Register 105 is not applicable to the addressed memory location, logic gates 155 generate one or more of the signals $\overline{MCM1}$, $\overline{MCM2}$ or $\overline{MCM3}$, as indicated in the logical combination signal diagrams of logic gates 155 in FIG. 18.

Logic gate MVDF, identified by reference numeral 165, receives the output signals of logic gates 155 in addition to signals MF13, MF14 and $\overline{MXAQ}$. Logic gate 165 provides output signal MVDF if one or more of output signals $\overline{MCM1}$, $\overline{MCM2}$ and $\overline{MCM3}$ issue and if certain other conditions exist, viz.:

(1) (MF13) the system is in the trap mode (MTRM), the indicated volume difference is not the result of a system protection violation ($\overline{MTRP}$), the system is not in the process of transferring a new status word to L-Register 105 because of the previously detected volume difference ($\overline{MAMV}$), the volume difference is not due to an automatic program interrupt ($\overline{SPII}$), and (2) either (a) (SC01 $\overline{MXAQ}$) the instruction being fetched from memory is not the object instruction of an XEC instruction ($\overline{XEXC}$) and not within a quasi-subroutine ($\overline{XQUA}$), or (b) (MF14) memory is being addressed from I-Register 101 (SAMI) during a sequence control state other than sequence control state 1

(SC01) not as a result of an automatic program interrupt (SP12) and the operand being addressed is not relative addressed within a quasi-subroutine (MF17). If the latter condition does not exist, i.e. the addressed operand is being relatively addressed in a quasi-subroutine, a housekeeping function which cannot interfere with operating programs is being performed and status of the addressed location need not be checked.

The logical schematic diagram illustrating the structure of logic gate 165 is provided in FIG. 19. The logical combination signal diagrams illustrating the generation of signals MF13, MXAQ, MF14 are provided in FIG. 17.

Output signal MVDF of logic gate 165 is applied to volume difference logic 168. The logical schematic diagrams of volume difference logic 168 are provided in FIG. 20. As illustrated in FIG. 20, in response to signal MVDF and timing signal MRLS, gating signal MTAV is generated and applied to the input gates of V-Register 104 to transfer the most-significant six bits of the address in I-Register 101 or P-Register 103 to V-Register 104. Volume difference flip-flop AMV is set to the 1-state in response to signal MVDF and timing signal TLPE, causing signal MAMV to issue. Signal MAMV gates the new contents of V-Register 104 to logic gates 152, as illustrated in the logical schematic diagrams of FIG. 15. Gating signal MAMV also enables gate MA06 of logic gate 151, as shown in FIG. 14. In response to signal MAMV and timing signal TSCB, signal MLSR issues to set all of the flip-flops of L-Register 105. Signal MAL1 also issues in response to signal MAMV and timing signal MRLS to gate the new memory protect status word obtained from memory and available at the outputs of parallel adder unit 110 into L-Register 105. Signal MSSI, as shown in FIG. 17, becomes a binary 0 in response to either of signals MVDF or MAMV to hold the arithmetic and control unit in its present sequence control state.

Flip-flops L15-L00 of L-Register 105 are all set to the 1-state in response to signal MLSR generated by volume difference logic 168 and timing signal TCK1, as illustrated in the flip-flop input diagrams of L-Register 105 provided in FIG. 21. In response to signal MAL1 generated by volume difference logic 168 and timing signal TCK1, the sixteen significant bits of a 24-bit system protection status word are transferred from the outputs of parallel adder unit 110 into L-Register 105, by virtue of the appropriate binary 0 output signals U22S, U21S, U19S, U18S, U16S, U15S, U13S, U12S, U10S, U09S, U07S, U06S, U04S, U03S, U01S and U00S of parallel added unit 110 causing the corresponding flip-flops of L-Register 105 to be reset to the 0-state, as illustrated in FIG. 21. Output signals FL14-FL00 and FL14-FL00 are applied to logic gates 160-163.

Logic gates 160 receive output signals MA08-MA06 of logic gates 151 in addition to the output signals of flip-flops L15-L12 of L-Register 105, as illustrated in the logical schematic diagrams of FIG. 22 illustrating the logical structure of gates 160. Output signals M31X and M3X1 of logic gates 160 represent the system protection status code applicable to either the seventh or the eighth 64-word memory block of the volume identified in V-Register 104, depending upon the memory block addressed as indicated by the output signals of logic gates 151. The output signals of logic gates 160 are applied to logic gates ML1X and MLX1, identified by reference numeral 170.

Logic gates 161 receive output signals MA08-MA06 of logic gates 151 and the output signals of flip-flops L11-L08 of L-Register 105, as illustrated in the flip-flop input diagrams of FIG. 23 illustrating the logical structure of gates 161. Output signals M21X and M2X1 of logic gates 161 represent the system protection status code applicable to either the fifth or the sixth 64-word memory block of the volume identified in V-Register 104, depending upon the memory block containing the addressed storage location as indicated by the output signals of logic gates 151. The output signals of logic gates 161 are applied to logic gates 170.

Logic gates 162 receive signals MA08-MA06 of logic gates 151 and the output signals of flip-flops L07-L04 of L-Register 105, as illustrated in the logical schematic diagrams of FIG. 24 which show the logical structure of gates 162. Output signals M11X and M1X1 of logic gates 162 represent the system protection status code applicable to either the third or forth 64-word memory block of the volume identified in V-Register 104, depending upon which memory block contains the addressed storage location as indicated by the output signals of logic gates 151. The output signals of logic gates 162 are applied to logic gates 170.

Logic gates 163 receive output signals MA08-MA06 of logic gates 151 and the output signals of flip-flops L03-L00 of L-Register 105, as illustrated in the logical schematic diagrams of FIG. 25 showing the logical structure of gates 163. Output signals M01X and M0X1 of logic gates 163 represent the system protection status code applicable to either the first or second 64-word memory block of the volume identified in V-Register 104, depending upon which memory block contains the address storage location as indicated by the output signals of logic gates 151. The output signals of logic gates 163 are applied to logic gates 170.

Logic gates 170 receive the output signals of logic gates 160-163, as illustrated in the logical schematic diagrams of FIG. 26 showing the logical structure of gates 170. Output signal ML1X of logic gates 170 is a binary 1 if the most-significant bit of the memory protection status code in L-Register 105 applicable to the addressed storage location is a binary 1. Similarly, output signal MLX1 of logic gates 170 is a binary 1 if the least significant bit of the system protection status code in L-Register 105 applicable to the addressed memory storage location is a binary 1. Thus, output signals ML1X and MLX1 of logic gates 170 represent the system protection status code applicable to the 64-word memory block of the memory volume, corresponding to the status word in L-Register 105, which contains the memory storage location being addressed from I-Register 101 or P-Register 103. The output signals of logic gates 170 are applied to logic gate ML11 identified by reference numeral 172, logic gate ML01 identified by reference numeral 173, logic gate ML00 identified by reference numeral 174 and logic gates MF04-MF01 identified by reference numeral 175.

Referring to FIG. 27 which comprises logical schematic diagrams illustrating the logical structure of gates 172, 173 and 174, output signal ML11 of logic gate 172 is a binary 1 if the applicable protect status code is 11. Similarly, output signal ML01 of logic gate 173 is a binary 1 if the applicable system protection status code is 01. Output signal ML00 of logic gate 174 is a binary 1 if the applicable protection status code is 00. The output signals of logic gates 172, 173 and 174 are applied to logic gates 175.

Logic gates 175, in addition to receiving the output signals of logic gates 172, 173 and 174, receive the output signals of Q logic gates MF18, MF17, MF12 and MF10-MF06, identified by reference numeral 180, and other signals generated in the system, viz. signals SC01, SC04, WD01, WTRP, TT5E, MTRM, TSCA, SAMW, DGN2 and MVDA, as illustrated in FIG. 12. The latter signals are generated by appropriate logic in the system in accordance with specific conditions, as known in the art. Logic gates 175 also receive output signals ML1X and MLX1 from logic gates 170. FIG. 28 illustrates the logical schematic diagrams showing the logical structure of gates 175. FIG. 29 comprises the logical schematic diagrams illustrating the logical structure of logic gates 180.

Logic gates 175 and associated logic gates 180 define, during the system protection or trap mode, the conditions under which addressing of the memory storage location identified by the contents of I-Register 101 or P-Register 103 is permissible and therefore define violations of system protection requirements. The output signals of logic gates 175 are applied to logic gate MFVL identified by reference numeral 185. The logical structure of logic gate 185 is illustrated by the logical schematic diagrams of FIG. 30. Output signal MFVL of logic gate 185 thus issues to indicate a system protection violation if any one of the output signals MF04–MF01 of logic gates 175 is a binary 1. The logical schematic diagram of FIG. 31 illustrates, in concise form as a function of the system protection status code for the addressed memory location, the instruction being executed, and various other conditions in the system, the conditions under which signal MFVL is generated to indicate a system protection violation. Output signal MFVL of logic gate 185 is applied to trap logic 190.

Referring to FIG. 31, a system protection violation occurs and signal MFVL issues when:

(1) The system is operating in the system protection or trapping mode (MTRM) with the correct system protection status word in L-Register 105 ($\overline{\text{MVDF}}$), memory locations $00000_8$–$00017_8$ are not being addressed, ($\overline{\text{MPXN}}$), an automatic program interrupt is not being serviced ($\overline{\text{SPI2}}$), memory is being addressed from either I-Register 101 (SAMI) or P-Register 103 (SAMP),
  (A) memory is not being relatively addressed in a in a quasi-subroutine ($\overline{\text{XQUA}}$ $\overline{\text{FI14}}$), and if
    (1) the protect status code is 00 and the system is in sequence control state 4, or
    (2) the protect status code is 00, the system is in sequence control state 3 or the system is in sequence control state 2 and the instruction being executed is LDX (DLDX), or
    (3) the protect status code is 01, the instruction being executed is store A (DSTA) and the system is in sequence control state 4, or
    (4) the protect status code is 00 or 01, the instruction being executed is STQ (DSTQ) and the system is in sequence control state 3 or the instruction being executed is not LDX ($\overline{\text{DLDX}}$) and the system is in sequence control state 2, or (2) The conditions in paragraph 1 above exist and the protect status code is 00 or 10, the system is in sequence control state 1 and the instruction being executed is not the object instruction of instruction XEC and not an instruction in a quasi-subroutine ($\overline{\text{MXAQ}}$), or
    (3) the system is operating in the trapping mode (MTRM) with the correct status word in L-Register 105 ($\overline{\text{MVDA}}$) a Gen II instruction initiating an input/output operation is being executed during sequence control state 1 (SC01 TSCA) an automatic program interrupt is not being serviced ($\overline{\text{SAMW}}$) and a trap has not already occurred ($\overline{\text{MTRP}}$), or
    (4) the system is in sequence control state 1, a trap has not already occurred ($\overline{\text{MTRP}}$) and a watchdog error has occurred (WD01). Signal WD01 issues to indicate a watchdog error if the servicing of programs interrupts is inhibited for a predetermined period, for example due to a program loop.

The conditions under which a system protection violation is recognized and a trap occurs are summarized in FIG. 32.

Trap logic 190 receives the output signal of logic gate 185. In response to output signal MFVL of logic gate 185, trap logic 190 provides signal MTRP which initiates corrective action in the system. The logical structure of trap logic 190 is illustrated in the logical schematic diagrams of FIG. 33.

SYSTEM PROTECTION APPARATUS—OPERATION

In utilizing the system protection apparatus of the invention, a distinction is drawn between operating programs which have been debugged, i.e. have been tested and all programming errors corrected, and undebugged programs. The system protection arrangement of the invention is of particular significance when undebugged programs are being checked or debugged on-line, for example in the environment of a time-sharing system wherein debugged operating programs are being executed contemporaneously with the checking out of the undebugged program or in the context of a process control computer system wherein the computer time not employed by the debugged operating programs is utilized to check out undebugged programs. In either case, non-interference of the undebugged program with the operating programs must be assured in order that the integrity of the operating programs is maintained and stored data which is utilized in conjunction with the operating programs is not modified. Such protection of operating programs and associated data is especially important in process control systems wherein such interference could result in loss of control of the controlled equipment or the controlled process.

The system protection arrangement of the invention is utilized whenever an undebugged program is executed in the computer system. The system protection arrangement is actuated and rendered effective when trapping mode flip-flop TRM is set to the 1-state and is rendered inactive when flip-flop TRM is reset to the 0-state. As illustrated in the logical schematic diagrams of FIG. 17, trapping mode flip-flop TRM is set to the 1-state in response to signal MSTM which issues upon commencement of execution of an undebugged program in the computer, viz. upon execution of Gen II instruction DSTM. Similarly, signal MRTM issues to reset trapping mode flip-flop TRM upon termination of execution of the undebugged program as the computer returns to execution of an operating program, or upon fetching the DSPB instruction in memory location $00020_8$ in response to a system protection violation. Thus, signals MSTM and MRTM may be generated in the system at appropriate times under program control, by appropriate logic or, for example, by means of operator-actuated switches.

Figure 34:
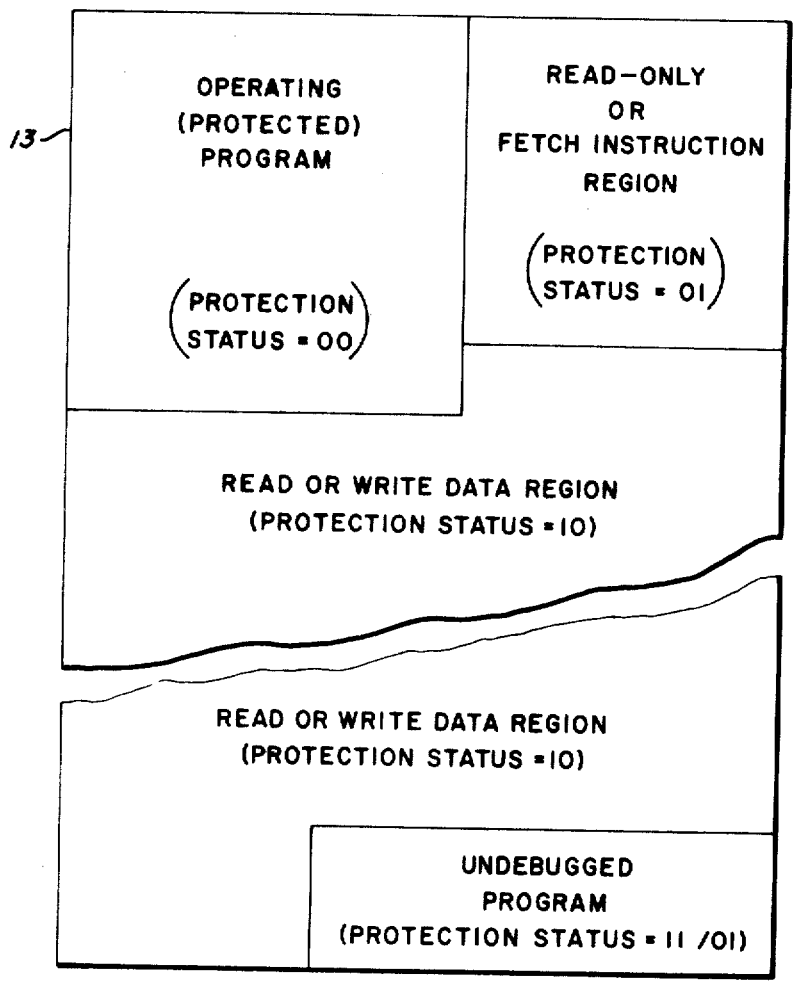
FIG. 34 illustrates diagrammatically a typical memory map employed in conjunction with the system protection apparatus of the invention.

FIG. 34 illustrates a typical map of magnetic core storage unit 13 of the computer system. The storage locations of memory containing the operating program are assigned a protection status code of 00 to prevent use of the storage locations by the undebugged program. The memory storage locations containing information and data utilized in conjunction with the operating program and which must be protected from change are assigned protection status code 01 which permits an undebugged program to read information from these storage locations but prevents the undebugged program from writing information into the memory storage locations assigned this status code. The read-only data region may also contain commonly used subroutines such as quasi-subroutines utilized for execution of quasi instructions. The memory storage locations containing the undebugged programs will normally be assigned either protect status code 11 permitting unlimited use of the storage locations or 01 permitting the undebugged program full freedom to read data or instructions from the storage locations. Another area of memory may be assigned the protection status code 10 and serves as a scratch pad area from which information may be read or in which information may be stored but in which programs may not be stored.

In operation, trapping mode flip-flop TRM is set to the 1-state and the system protection apparatus is effective each time execution of an undebugged program is initiated in the computer system. In the trapping mode, the system is protected from potentially destructive actions initiated by an undebugged program. To this end, all memory accesses by the arithmetic and control unit are monitored, use of memory locations is regulated by the protection status code assigned to those memory locations thereby preserving protected areas of memory, unauthorized input/output operations are prevented and entry of the computer system into a loop which would prevent the servicing of real-time requirements (watchdog error) is avoided. In the latter case, a watchdog flip-flop is provided to identify the type of watchdog error detected.

Figure 35:
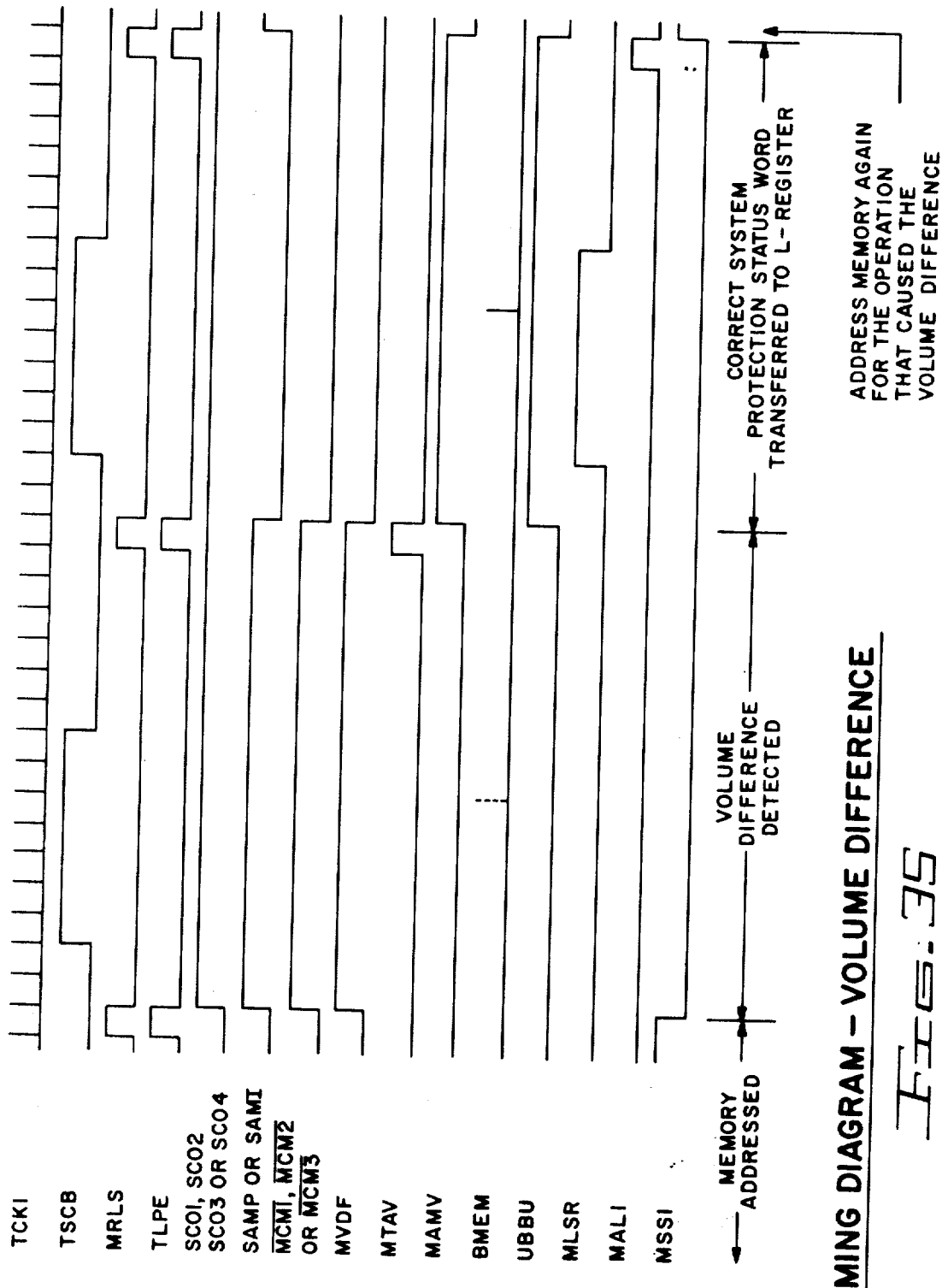
FIG. 35 a timing diagram illustrating the timing sequence of signals in the system during detection of a volume difference by the system protection apparatus of the invention.

FIG. 35 is a timing diagram illustrating the operation of the system protection apparatus in detecting volume differences, i.e. the existence of incorrect system protection status words in L-Register 105. Referring to FIG. 35, each time that memory is addressed from either I-Register 101 or P-Register 103, as indicated by signal SAMI or signal SAMP, the six most-significant bits of the memory address, identifying the memory volume containing the addressed storage location, are compared with the contents of V-Register 104 which identify the memory volume corresponding to the system protection status word presently stored in L-Register 105. If a difference between the six most-significant bits of the memory address and the contents of V-Register 104 exists, indicating that L-Register 105 does not contain the protection status code applicable to the addressed memory location, one of signals $\overline{MCM1}$, $\overline{MCM2}$ or $\overline{MCM3}$ issues, as shown in FIG. 35. In response to one of signals $\overline{MCM1}$, $\overline{MCM2}$ or $\overline{MCM3}$, signal MVDF issues if the indicated volume difference is not the result of a previous system protection violation, a new status word is not being transferred to L-Register 105 because of a previously detected volume difference, and a program interrupt request is not being serviced. In addition, signal MVDF will not issue if the system is in sequence control state 1 where memory is not being addressed from I-Register 101 or the instruction being executed is relatively addressed within a quasi-subroutine or if the system is in a sequence control state other than sequence control state 1 and the instruction being executed is the object instruction of an XEC instruction or within a quasi-subroutine. The above exceptions exist because the specified conditions do not require the monitoring of system protection codes. Assuming that none of the specified conditions giving rise to an exception exists, signal MVDF issues, as shown in FIG. 35. Signal MSSI becomes a binary 0, causing the system to remain in its present sequence control state.

Upon issuance of signal MRLS from memory 11, signal MTAV issues, gating the six most-significant bits of the memory address from either I-Register 101 or P-Register 103 into V-Register 104. Flip-flop AMV is set to the 1-state and signal MAMV issues, addressing memory from V-Register 104 and causing output signal MA06 of logic gates 151 to be binary 1 to thereby address the memory storage location containing the system protection status word corresponding to the addressed memory location. Signal SAMP or SAMI, whichever is applicable, becomes a binary 0 because memory is being addressed from V-Register 104. Because the contents of V-Register 104 now correspond to the most-significant six bits of the address of the specified memory location, signal MVDF becomes a binary 0.

Figure 36:
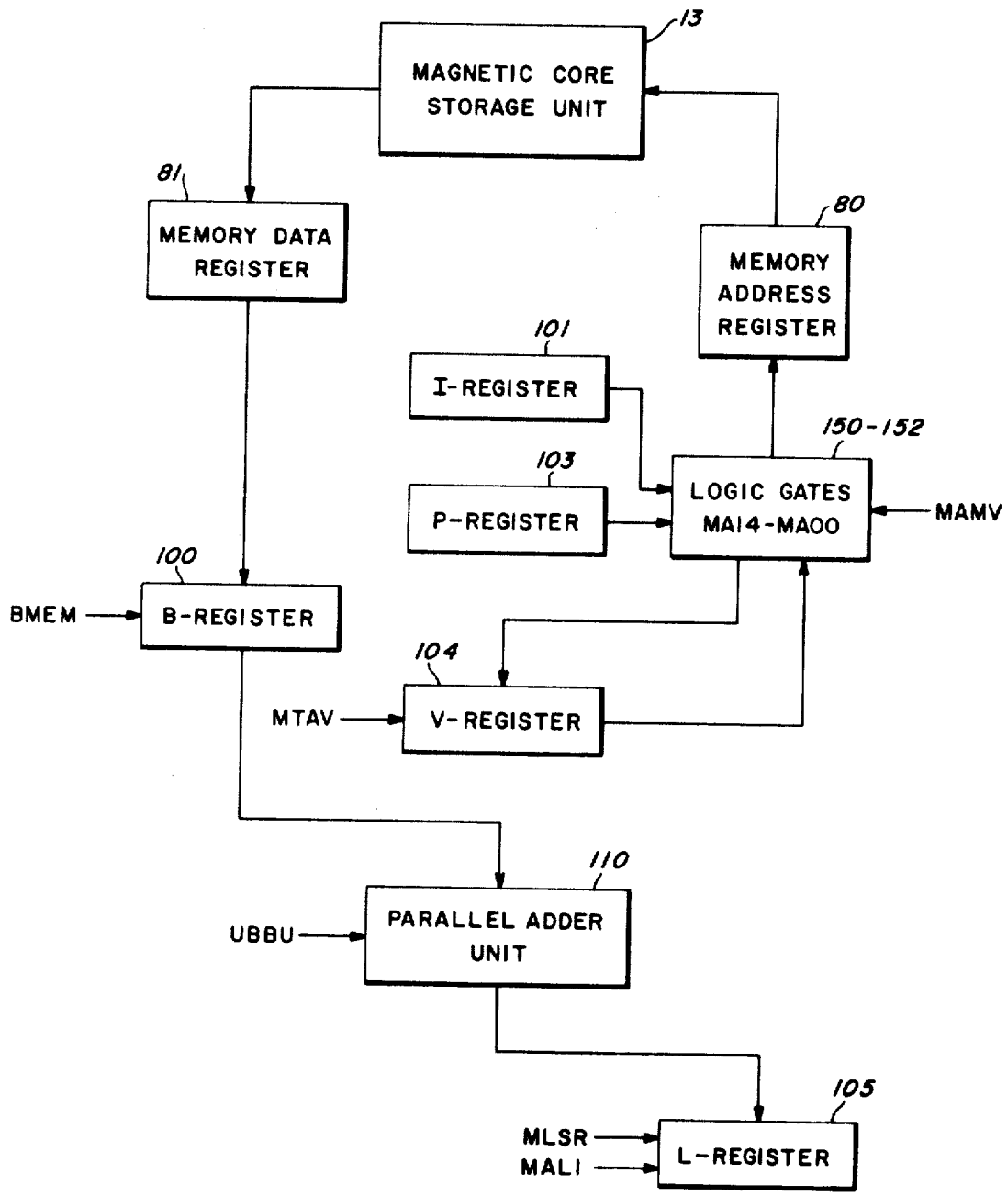
FIG. 36 is a block diagram illustrating the major information flow paths between various elements of the system in response to detection of a volume difference.

The system protection status word addressed from V-Register 104 is read from magnetic core storage 13 and transferred from memory data register 81 to B-Register 100 in response to gating signal BMEM. Gating signal UBBU applies the contents of B-Register 100 to parallel adder unit 110. Upon issuance of timing signal TSCB, signal MLSR issues, setting all flip-flops of L-Register 105 to the 1-state. Upon issuance of memory release signal MRLS, signal MAL1 issues transferring the sixteen system protection status code bits of the 24-bit system protection status word from the outputs of parallel adder unit 110 to L-Register 105. After the correct system protection status word is stored in L-Register 105, memory is addressed again from I-Register 101 or P-Register 103 for the operation that caused detection of the volume difference. This time, the completion of the operation is permitted provided a system protection violation or trap does not occur. FIG. 36 is a block diagram illustrating the information transfers which occur upon detection of a volume difference in the system.

After the correct system protection status word is contained in L-Register 105, bits 6–8 of the memory address indicating the 64-word memory block of the memory volume containing the addressed memory location are employed by logic gates 160–163 to select the proper system protection status code in L-Register 105. The bits of the selected system protection status code are decoded in logic gates 170, 172, 173 and 174 and are used by logic gates 175 to check for a system protection violation. The conditions under which the violation occurs are expressed in the logical schematic diagram of FIG. 31 illustrating the logical structure for generation of signal MFVL and in the diagram of FIG. 32. In general, a system protection violation is detected:

(a) if the addressed memory storage location is in an inaccessible area (status code 00), an instruction in a quasi-subroutine is being executed but the operand is not relatively addressed, indicating that the operation is other than the housekeeping operation; if the operand were relatively addressed, the housekeeping operation being performed could not affect system security and no trap would occur (MF04);

(b) the addressed memory location is in an inaccessible area (status code 00) and the system is either in sequence control state 3 or is in sequence control state 2 executing an LDX command; however, if the operand is being relatively addressed in a quasi-subroutine, a housekeeping operation is indicated and no trap occurs (MF17);

(c) the addressed memory location is either in an inaccessible area or in a read-only area (status code 00 or 01), the system is in sequence control state 2 executing a DMT instruction or in sequence control state 3 executing an STQ instruction, unless the operands of these instructions are being relatively addressed in a quasi-subroutine, indicating a housekeeping operation (MF02);

(d) the addressed memory location is in an inaccessible area or in a read/write area (status code 00 or 10), an instruction is being fetched from memory and is not the object instruction of an XEC command and not an instruction of a quasi-subroutine (MF03);

(e) the addressed memory location is in a read-only area (status code 01) the STA command is being executed and, if the command is in a quasi-subroutine, the operand is not being relatively addressed and the operation is therefore not a housekeeping operation (MF02);

(f) a Gen II command is being executed to initiate an input/output operation (MF04); or (g) a watchdog error has occurred (MF04).

Conditions (c) and (e) above protect a read-only area from all store commands in the instruction repertory, unless the store operation is a housekeeping operation in a quasi-subroutine.

It should be noted that the system protection arrangement is not applicable to execution of routines for servicing automatic program interrupts. Such interrupts can interrupt execution of an undebugged program at any time. In this regard, the quasi flip-flop which is set when a quasi-subroutine is being executed while the system is in the trapping mode permits the fetching of instructions of a quasi-subroutine as well as the execution of housekeeping operations in a quasi-subroutine. Upon interruption by a program interrupt, the trapping mode flip-flop is reset while the interrupt service routine is executed. However, DLPR and DLDP instructions within the service routine do not reset the quasi flip-flop and the system returns to the interrupted quasi-subroutine and the trapping mode upon completion of execution of the service routine. The quasi flip-flop is reset by DLDP or DLPR instructions at the end of the quasi-subroutine in the trapping mode.

Although the above conditions are specified for the illustrated embodiment, any variations of these may be adopted according to the protection requirements of a given system. In the illustrated embodiment, the stated conditions for a system protection violation serve to adequately protect the system against errors in an undebugged program.

Referring to FIG. 37, after the correct system protection status word is obtained from memory and stored in L-Register 105, if a volume difference was detected, the system protection status code applicable to the addressed memory location is checked. If any one of gates MF01, MF02, MF03 or MF04 is enabled indicating a system protection violation, signal MFVL issues. Signal MFVL causes signal MSSI to become a binary 0, inhibiting certain operations in the arithmetic and control unit in order to prevent interference with operating programs by the undebugged program. Signal $\overline{STOR}$ becomes a binary 1 to inhibit the storing of information in memory. At the next timing signal TLPE, trap flip-flop TRP is set to the 1-state, causing signal MTRP to issue. The system enters sequence control state 5 and signals UIAU and UILA issue to apply the contents of I-Register 101 to the inputs of parallel adder unit 110. Gating signals BAUL and BAUU also issue to gate the outputs of parallel adder 110 into B-Register 100, thereby completing the transfer of the contents of I-Register 101 to B-Register 100. Signal $\overline{STOR}$ becomes a binary 0, permitting a write operation to be initiated in memory. Gates MA00 and MA04 are enabled by signal MTRP to address memory storage location $00021_8$, causing the contents of I-Register 101 in B-Register 100 to be stored in memory location $00021_8$.

The system next enters sequence control state 1. Gate MA04 is enabled by signal MTRP to provide the address of memory storage location $00020_8$ to memory address register 80. The contents of storage location $00020_8$ comprise an SPB command for initiating the execution of a corrective routine. The SPB command is transferred to the arithmetic and control unit and the trapping mode and trap flip-flops are reset. The error routine is then executed to correct the condition which gave rise to the system protection violation.

Figure 38A:
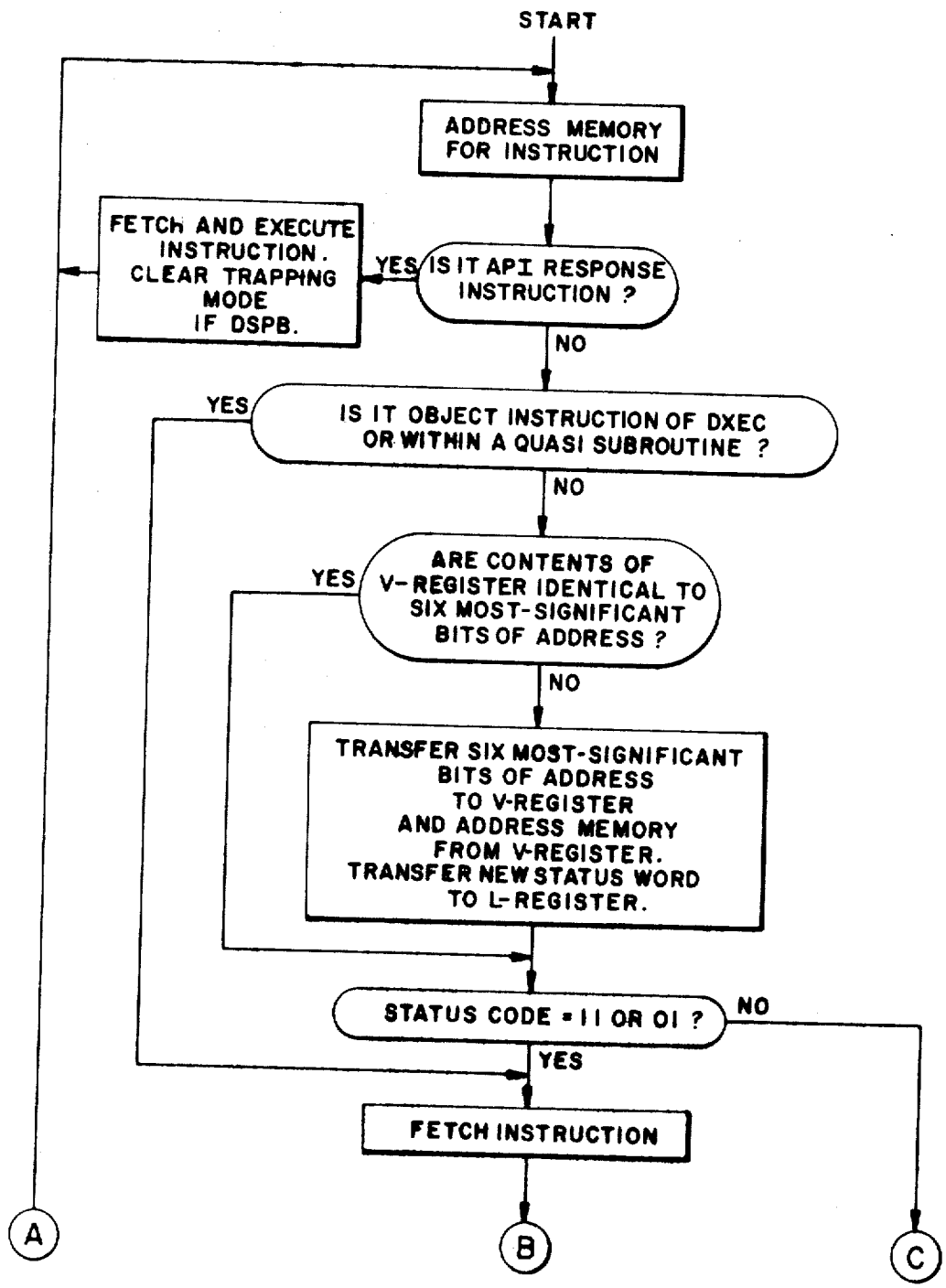

FIG. 38 is a flow diagram illustrating the operation of the system protection apparatus. Referring to FIG. 38, assuming that an undebugged program is being executed, the trapping mode flip-flop is set and memory is being addressed to fetch an instruction during sequence control state 1, if an automatic program interrupt is being serviced, the instruction is fetched and executed and, if it is a store place and branch (DSPB) instruction, the trapping mode flip-flop is reset. If no program interrupt has occurred, and if the instruction being fetched is the object instruction of an execute (DXEC) command or within a quasi subroutine, the instruction fetch operation is completed. Otherwise, a check is made to determine if a volume difference exists, i.e. if the system protection status word in L-Register 105 is applicable to the addressed storage location. If a volume difference does exist, the contents of V-Register 104 are updated and memory is addressed from V-Register 104 to obtain the correct status word for transfer to L-Register 105.

The status code of the correct memory protect status word in L-Register 105 is checked and if it is either 00 or 10, the fetching of the instruction from the addressed memory storage location is prohibited and a system protection violation occurs. In response to detection of a system protection violation, the instruction in I-Register 101 is transferred to memory storage location $00021_8$ and the contents of storage location $00020_8$ are fetched to initiate execution of a corrective subroutine.

If the applicable status code is either 11 or 01, the instruction is fetched from memory. If the instruction is a Gen II (DGN2) instruction, a system protection violation occurs. If the instruction is not a Gen II but is either a Gen I, a Gen III, or one of the instructions which affect the contents of an index location (storage locations $00001_8$–$00007_8$), viz. DINX, DLXC, DLXK or DTXH, or a relatively addressed instruction within a quasi-subroutine (indicating a housekeeping operation) the instruction is executed. If the instruction is none of the above, memory is addressed from I-Register 101 containing the instruction operand address field. At this time, if a volume difference is detected, the correct status word is obtained from memory and transferred to L-Register 105, as described above.

After the correct system protect status word is in L-Register 105, the instruction is executed if the status code applicable to the address storage location is 11. If the status code applicable to the address storage location is 01 and if the instruction is not an instruction such as DSTA, DSTX, DDMT or DSTQ which could change the contents of the addressed storage location, the instruction is executed. Even if the instruction is one of these four instructions, it is executed if the storage location addressed by the instruction word is one of the storage locations $00000_8$–$00017_8$. If the status code applicable to the address storage location is 10 and if the instruction is not one such as DBRU, DBTS, DLDP, DBTR, DLPR or DSPB which transfers program control, the instruction is executed. If the status code is 10 and the instruction is one of the six listed above or if the status code is 00, the instruction is executed if the storage location addressed by the instruction is one of the locations $00000_8$–$00017_8$. If not, a system protection violation occurs. As shown in FIG. 38, a system protection violation also occurs when a watchdog error is detected and the system is in the trapping mode.

The tables presented below summarize the operation of the system protection apparatus. Table A illustrates the conditions under which a system protection violation or trap occurs during addressing of memory to fetch an instruction. Table B illustrates the conditions under which a system protection violation occurs during addressing of memory to execute an instruction.

TABLE A.—INSTRUCTION FETCH TRAPPING

| Instruction | From memory locations assigned status bits | Trapped/ not trapped |
|---|---|---|
| API response instruction | 00 | Not trapped. |
|  | 01 | Do. |
|  | 10 | Do. |
|  | 11 | Do. |
| DXEC object instruction | 00 | Do. |
|  | 01 | Do. |
|  | 10 | Do. |
|  | 11 | Do. |
| Quasi subroutine instructions | 00 | Do. |
|  | 01 | Do. |
|  | 10 | Do. |
|  | 11 | Do. |
| System protection violation instruction ($20^8$). | 00 | Do. |
|  | 01 | Do. |
|  | 10 | Do. |
|  | 11 | Do. |
| All others | 00 | Trapped. |
|  | 01 | Not trapped. |
|  | 10 | Trapped. |
|  | 11 | Not trapped. |

TABLE B.—INSTRUCTION EXECUTE TRAPPING

| Instruction | Status bits of effective Operand address location | Trapped/ Not trapped |
|---|---|---|
| DSTX, DDMT, DSTQ, DSTA | 00 | Trapped.* |
|  | 01 | Do.* |
|  | 10 | Not trapped. |
|  | 11 | Do. |
| DLDX, DDVD, DMPY, DLDA, DERA, DADD, DLDP, DANA, DORA, DLDX, DSUB, DLPR, DLOQ. | 00 | Trapped.* |
|  | 01 | Not trapped. |
|  | 10 | Do. |
|  | 11 | Do. |
| DGN1, DGN3, DLXK, DLXC, DTXH, DINX, Quasi, Relative addressed instructions within Quasi Subroutine. | 00 | Do. |
|  | 01 | Do. |
|  | 10 | Do. |
|  | 11 | Do. |
| Gen II | 00 | Trapped. |
|  | 01 | Do. |
|  | 10 | Do. |
|  | 11 | Do. |
| Instructions within Quasi Subroutine that are not relative Addressed. | 00 | Instructions are subject to trapping during execution as listed above. |
|  | 01 |  |
|  | 10 |  |
|  | 11 |  |

*If the effective address of the store or load function is within 00 thru 17$_8$, the instruction is not trapped.

NOTE.—Since the execution of DBRU, DBTR, DBTS, DXEC and DSPB is fetching the next instruction, refer to Table A for trapping conditions.

In summary, the system protection apparatus and arrangement of the invention provides efficient and reliable protection of operating programs and associated data in memory while permitting the protection status information for all memory locations to be stored in a relatively small area of memory. The organization of the memory and the protection status words according to the invention facilitates the map definition of memory. The ability of the system protection apparatus to distinguish between instruction fetch and data fetch and between different types of instructions provides flexibility. The ability of the system protection arrangement to designate at least four protection states also increases the flexibility of the arrangement; the availability of a third protection status bit for each 64-word block permits expansion of the system to provide up to eight protect states for each block. The system protection arrangement prevents initiation of all input/output operations during execution of an undebugged program in order to adequately protect the stored programs and data in memory and to insure that unauthorized control actions are not initiated. The servicing of program interrupts is not restricted by the memory protection arrangement since the system automatically leaves the system protection or trapping mode in response to a program interrupt. The system also protects against loops which might be initiated by an undebugged program interfering with execution of the operating program, thereby permitting the real time requirements of the system to be satisfied.

Accordingly, there has been described herein digital computer apparatus embodying the instant invention. Although the principles of the invention have now been made clear in an illustrative embodiment, there will be immediately obvious to those skilled in the art many modifications in structure, arrangement, proportions, elements, materials and components used in the practice of the invention, and otherwise, which are particularly adopted for specific environments and operating requirements. The appended claims are therefore intended to cover and embrace any such modifications, within the limits only of the true spirit and scope of the invention.

What is claimed is:

1. In a computer system including a memory comprising a plurality of storage locations and an arithmetic unit for communicating with the storage locations of memory, the combination comprising:
a plurality of protection status words stored in designated storage locations of said memory, each status word applicable to a different volume of said memory and comprising a plurality of multiple bit status codes, each status code applicable to a different block of the volume, each status code bit configuration identifying a different set of conditions which, if met, indicate a system protection violation,
an address register in said arithmetic unit for identifying a memory storage location with which the arithmetic unit is to initiate communications.
a status register for storing a status word,
a volume register for storing the identification of the volume of memory to which the status word in said status register is applicable,
comparison means for comparing the contents of said address register with the contents of said volume register and generating a signal if the memory storage location identified by the contents of said address register does not fall within the volume identified in said volume register,
means responsive to the signal and to the contents of said address register for changing the contents of said volume register to identify the volume including the memory location identified by the contents of said address register and for transferring from memory to said status register the corresponding status word,
decode means responsive to the contents of said address register for selecting the status code of the status word in said status register applicable to the identified storage location, and
means responsive to the selected status code for controlling communications between the arithmetic unit and the identified memory storage location.

2. In a computer system including a memory comprising a plurality of storage locations and an arithmetic unit for communicating with the storage locations of memory in response to instruction words, the combination comprising:
a plurality of protection status words stored in designated storage locations of said memory, each status word applicable to a different volume of said memory and comprising a plurality of multiple bit status codes, each status code of the status word applicable to a different block of storage locations of the volume, each status code bit configuration identifying a different set of conditions which, if met, indicate a system protection violation,
an instruction register in said arithmetic unit for storing an instruction word including a first field identifying the operation to be performed in the system and a second field identifying a memory storage location with which the arithmetic unit is to communicate in executing the operation,
a status register for storing a status word,
a volume register for storing the identification of the volume of memory to which the status word in said status register is applicable,
comparison means for comparing the contents of said instruction register with the contents of said volume register and generating a signal if the memory storage location identified by the contents of said instruction register does not fall within the volume identified by said volume register,
means responsive to the signal and to the contents of said instruction register for changing the contents of said volume register to identify the volume including the memory location identified by the contents of said instruction register and for transferring from memory to said status register the corresponding status word,
decode means responsive to the contents of said instruction register for selecting the status code of the status word in said status register applicable to the block including the identified storage location, and
means responsive to the first field in said instruction register and to the selected status code for determining whether or not the communication between the arithmetic unit and the identified memory storage location required by the operation identified in the first field of said instruction register may be performed.

3. In a computer system including a memory comprising a plurality of storage locations for storing data and instruction words, peripheral subsystems for transmitting and receiving data and an arithmetic unit for communicating with memory and for transmitting data to or receiving data from the peripheral subsystems and processing data under the direction of instruction words, said instruction words being of first, second and third types, the first type instructions initiating the transfer of information to or from peripheral subsystems, the second type instructions not affecting the contents of memory locations or affecting only the contents of unprotected memory locations, the third type instructions initiating read or write operations affecting memory locations identified by the instruction word operand field, said arithmetic unit having at least one register for storing an instruction word, the combination comprising:

storage means in said arithmetic unit for storing a status word, said status word comprising a plurality of status codes, each status code applicable to different selected storage blocks of memory, and system protection means including first means responsive to an instruction of the first type in the register for inhibiting execution of the instruction by the arithmetic unit, second means responsive to the second type of instruction in the register for permitting execution of the instruction by the arithmetic unit and third means responsive to a third type instruction in the register and to the applicable status code in said storage means for determining whether or not execution of the instruction of the third type is permitted.

4. The combination of claim 3 including means for disabling said system protection means.

5. In a computer system including a memory comprising a plurality of storage locations for storing data and instruction words and an arithmetic unit for communicating with memory and for processing data under the direction of instruction words, said arithmetic unit having at least one register for storing an instruction word, the combination comprising:

storage means in said arithmetic unit for storing a plurality of status codes, each status code applicable to different selected storage locations of memory, each status code having one of four states, said first state permitting unlimited access to the corresponding memory location, said second state permitting no access to said corresponding memory location, said third state permitting the contents of the corresponding memory location to be transferred from memory to the arithmetic unit and said fourth state permitting the transfer of data to or from the corresponding memory location but not permitting the transfer of an instruction from the corresponding memory location to the arithmetic unit, system protection means responsive to the type of instruction word stored in the arithmetic unit register and to the applicable status code in said storage means for generating a signal upon detection of a system protection violation, and means responsive to a signal generated by said system protection means for inhibiting execution of the instruction in the arithmetic unit register.

6. In a computer system, the combination comprising:
a memory comprising a plurality of storage locations,
an arithmetic unit for communicating with the storage locations of memory,
a plurality of protection status words stored in designated storage locations of said memory, each status word comprising a plurality of multiple bit status codes, each status code applicable to a different block of storage locations of said memory, each status code bit configuration identifying a different set of conditions which, if met, indicate a system protection violation, an address register for storing the address of a memory storage location, a status register for storing a status word, a volume register for storing the identification of the blocks of storage locations to which the status word in said status register is applicable, means for comparing the address in said address register with the contents of said volume register and generating a signal if the memory location identified by the address in said address register does not fall within the blocks of storage locations identified by the contents of said volume register, means responsive to the signal for transferring from said address register to said volume register the identification of the blocks of storage locations which includes the storage location corresponding to the address in said address register, means responsive to the contents of said volume register for transferring from said memory to said status register the status word applicable to the storage location identified by the address in said address register, and means responsive to the status code of the status word stored in said status register applicable to the storage location identified by the address in said address register for controlling access by said arithmetic unit to the memory storage location identified by the address in said address register.

7. In a computer system including a memory comprising a plurality of storage locations and an arithmetic unit for communicating with the storage locations of memory, the combination comprising:

a plurality of protection status words stored in designated storage locations of said memory, each status word comprising a plurality of multiple bit status codes, each status code applicable to a different block of storage locations of said memory, each status code bit configuration identifying a different set of conditions which, if met, indicate a system protection violation, an address register in said arithmetic unit for storing the address of a memory storage location, a status register in said arithmetic unit for storing a status word, a volume register in said arithmetic unit for storing the identification of the blocks of storage locations to which the status word in said status register is applicable, comparison means in said arithmetic unit for comparing the address in said address register with the contents of said volume register and generating a signal if the storage location identified by the address of said address register does not fall within the blocks of storage locations identified by the contents of said volume register, means responsive to the signal and to the contents of said address register for transferring from memory to said status register the status word applicable to the storage location identified in said address register and for modifying the contents of said volume register accordingly, decode means responsive to the address of said address register for selecting the status code of the status word in said status register which is applicable to the memory storage location identified by the address in said address register, and means responsive to the output of said decode means for controlling access by said arithmetic unit to the memory storage location identified by the address in said address register.

8. In a computer system including a memory comprising a plurality of storage locations for storing data and instruction words and an arithmetic unit for communicating with memory and for processing data under the direction of instruction words, said instruction words comprising either a first type, a second type or a third type containing an operand address, said arithmetic unit having at least one register for storing an instruction word, the combination comprising:

storage means in said arithmetic unit for storing a status word, said status word comprising a plurality of multiple bit status codes, each status code applicable to different selected storage blocks of memory, each status code comprising one of four different codes, the first code prohibiting access to the corresponding storage locations, the second code permitting access to the corresponding storage locations, and the third and fourth codes either permitting or prohibiting access to the addressed memory locations depending upon the particular instruction being executed, and, system protection means including first means responsive to a first type instruction in the register for permitting execution of the instruction, second means responsive to a second type instruction in the register for inhibiting execution of the instruction in the register and third means responsive to a third type instruction in the register and to the status code in said storage means applicable to the memory location identified by the instruction operand address for determining whether execution of the instruction is permitted.

References Cited

UNITED STATES PATENTS

| | | | |
|---|---|---|---|
| 3,129,323 | 4/1964 | Stout et al. | 340—172.5X |
| 3,263,218 | 7/1966 | Anderson | 340—172.5 |
| 3,264,615 | 8/1966 | Case et al. | 340—172.5 |
| 3,377,624 | 4/1968 | Nelson et al. | 340—172.5 |
| 3,465,297 | 9/1969 | Thomas et al. | 340—172.5 |

PAUL J. HENON, Primary Examiner

M. B. CHAPNICK, Assistant Examiner